United States Patent
Dame et al.

(10) Patent No.: US 12,073,837 B2
(45) Date of Patent: Aug. 27, 2024

(54) SPEECH DETECTION USING IMAGE CLASSIFICATION

(71) Applicants: The Boeing Company, Chicago, IL (US); University of Washington, Seattle, WA (US)

(72) Inventors: Stephen Gregory Dame, Everett, WA (US); Les Eugene Atlas, Seattle, WA (US)

(73) Assignees: The Boeing Company, Arlington, VA (US); University of Washington, Seattle, WA (US)

( * ) Notice: Subject to any disclaimer, the term of this patent is extended or adjusted under 35 U.S.C. 154(b) by 261 days.

(21) Appl. No.: 17/805,822

(22) Filed: Jun. 7, 2022

(65) Prior Publication Data
US 2022/0406310 A1 Dec. 22, 2022

Related U.S. Application Data

(60) Provisional application No. 63/202,659, filed on Jun. 18, 2021.

(51) Int. Cl.
*G10L 15/24* (2013.01)
*G06V 10/82* (2022.01)
*G10L 15/05* (2013.01)

(52) U.S. Cl.
CPC .............. *G10L 15/24* (2013.01); *G06V 10/82* (2022.01); *G10L 15/05* (2013.01)

(58) Field of Classification Search
CPC ......... G10L 15/24; G10L 15/05; G10L 25/30; G10L 25/84; G06V 10/82
See application file for complete search history.

(56) References Cited

U.S. PATENT DOCUMENTS 6,771,701 B1 * 8/2004 Klindworth ........... H04M 9/082
  455/308
9,083,549 B2 7/2015 Dame
(Continued)

OTHER PUBLICATIONS

Cui, X. et al., "A Study of Variable-Parameter Gaussian Mixture Hidden Markov Modeling for Noisy Speech Recognition," IEEE Transactions On Audio, Speech And Language Processing, vol. 15, No. 4, May 2007, 11 pages.
(Continued)

*Primary Examiner* — Huyen X Vo
(74) *Attorney, Agent, or Firm* — Alleman Hall & Tuttle LLP

(57) ABSTRACT

Speech detection can be achieved by identifying a speech segment within an audio segment using image classification. An audio segment of radio communications is obtained. An audio sub-segment within the audio segment is extracted. A sampled histogram is generated of a plurality of sampled values across a sampled time window of the audio sub-segment. A two-dimensional image is generated that represents a two-dimensional mapping of the sampled histogram along a first dimension and a predefined histogram along a second dimension that is orthogonal to the first dimension. The two-dimensional image is provided to an image classifier previously trained using the predefined histogram. An output is received from the image classifier based on the two-dimensional image. The output indicates whether the audio sub-segment contains speech.

20 Claims, 10 Drawing Sheets

(56) References Cited

U.S. PATENT DOCUMENTS

| | | | |
|---|---|---|---|
| 9,342,481 B2 | 5/2016 | Swearingen et al. | |
| 9,420,314 B1 | 8/2016 | Dame | |
| 9,491,581 B1 | 11/2016 | Dame et al. | |
| 9,521,678 B2 | 12/2016 | Dame et al. | |
| 9,571,378 B2 | 2/2017 | Dame | |
| 9,654,808 B2 | 5/2017 | Dame | |
| 9,706,242 B2 | 7/2017 | Dame et al. | |
| 9,794,346 B2 | 10/2017 | Followell et al. | |
| 10,073,811 B2 | 9/2018 | Swearingen et al. | |
| 10,228,299 B2 | 3/2019 | Nicks et al. | |
| 10,462,783 B2 | 10/2019 | Dame | |
| 10,672,208 B2 | 6/2020 | Simms et al. | |
| 10,878,709 B2 | 12/2020 | Dame et al. | |
| 11,024,187 B2 | 6/2021 | Staudinger et al. | |
| 11,364,992 B2 | 6/2022 | Dame | |
| 2008/0120100 A1* | 5/2008 | Takeda | G10L 15/20 704/E21.012 |
| 2013/0282373 A1* | 10/2013 | Visser | G10L 21/0208 704/231 |
| 2021/0020168 A1 | 1/2021 | Dame et al. | |

OTHER PUBLICATIONS

Ghaemmaghami, H. et al., "Noise Robust Voice Activity Detection Using Normal Probability Testing and Time-Domain Histogram Analysis," Proceedings of the 2010 IEEE International Conference on Acoustics, Speech and Signal Processing, Mar. 14, 2010, 4 pages.

"Interspeech 2021 Special Session: Automatic Speech Recognition in Air Traffic Management (ASRATM)," Idiap Research Institute, Available Online at https://www.idiap.ch/en/scientific-research/speech-and-audio-processing/asr-atm-session, Available as Early as Apr. 18, 2021, 4 pages.

Rabiner, L. et al., "An Algorithm for Determining the Endpoints of Isolated Utterances," The Bell System Technical Journal, vol. 54, No. 2, Feb. 1975, 20 pages.

Ramirez, J. et al., "A New Kullback-Leibler VAD for Speech Recognition in Noise," IEEE Signal Processing Letters, vol. 11, No. 2, Feb. 2004, 4 pages.

Rangoussi, M. et al., "Higher Order Statistics Based Gaussianity Test Applied to On-Line Speech Processing," Proceedings of the 1994 28th Asilomar Conference on Signals, Systems and Computers, Pacific Grove, California, Oct. 31, 1994, 5 pages.

* cited by examiner

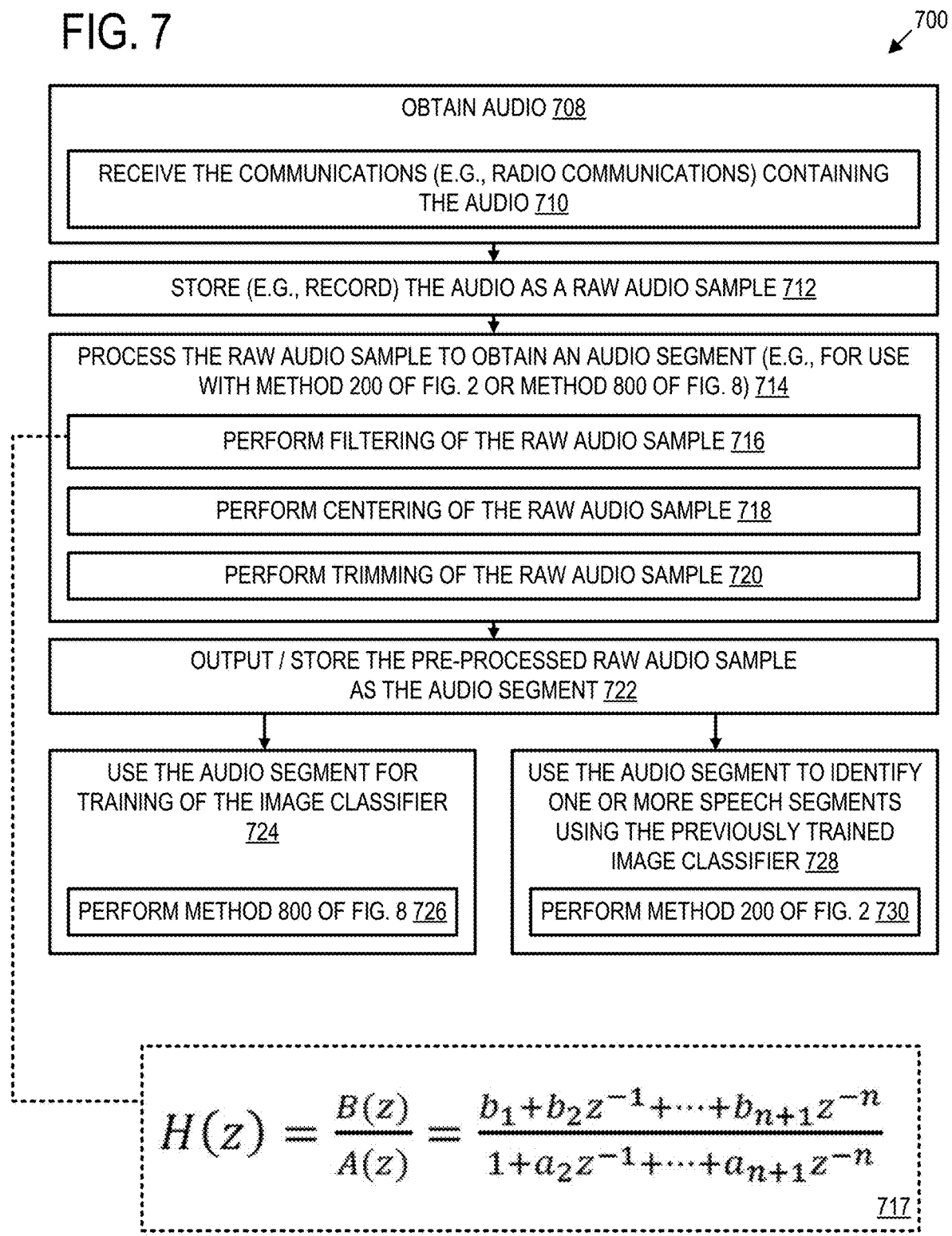

FIG. 8

PROCESS AUDIO TO OBTAIN A SET OF TRAINING DATA THAT INCLUDES A PLURALITY OF TWO-DIMENSIONAL IMAGES 808

PERFORM OPERATIONS 210 – 216 OF METHOD 200 OF FIG. 2 FOR ONE OR MORE AUDIO SEGMENTS CONTAINED IN THE AUDIO TO OBTAIN A PLURALITY OF SAMPLED HISTOGRAMS FROM OPERATION 216 810

DETERMINE A PROBABILITY DENSITY FUNCTION THAT IS REPRESENTATIVE OF ONE OR MORE OF THE SAMPLED HISTOGRAMS THAT DO NOT REPRESENT SPEECH (E.G., NOISE) 812

$$kl_d(p||q) = \int p(x) \log\left(\frac{p(x)}{q(x)}\right)$$
819

GENERATE THE PREDEFINED HISTOGRAM (E.G., OF OPERATION 218 OF FIG. 2) BASED ON THE PROBABILITY DENSITY FUNCTION 814

FOR EACH SAMPLED HISTOGRAM, GENERATE A TWO-DIMENSIONAL IMAGE 816

ASSIGN A TRAINING LABEL TO EACH TWO-DIMENSIONAL IMAGE 818

TRAIN AN IMAGE CLASSIFIER BY PROVIDING THE SET OF TRAINING DATA TO THE IMAGE CLASSIFIER 819

PROVIDE EACH TWO-DIMENSIONAL IMAGE TO THE IMAGE CLASSIFIER WITH THE ASSIGNED LABEL TO TRAIN THE IMAGE CLASSIFIER 820

ASSESS ACCURACY OF THE IMAGE CLASSIFIER THROUGHOUT TRAINING 822

UPON THE ACCURACY OF IMAGE CLASSIFIER ATTAINING A DESIRED ACCURACY, DEPLOY THE IMAGE CLASSIFIER FOR FIELD USE (E.G., FOR METHOD 200 OF FIG. 2) 824

SPEECH DETECTION USING IMAGE CLASSIFICATION

CROSS REFERENCE TO RELATED APPLICATIONS

This application claims priority to U.S. Provisional Patent Application Ser. No. 63/202,659, filed Jun. 18, 2021, the entirety of which is hereby incorporated herein by reference for all purposes.

FIELD

The present disclosure relates generally to detecting speech within audio by using image classification.

BACKGROUND

Machine-implemented speech detection has potential uses in a variety of fields. As a few examples, speech detected within audio can be processed into command inputs for a machine, converted into text or other formats, modulated in relation to other sounds or signals contained within the audio, and stored for subsequent uses. Numerous audio processing techniques have been developed or proposed for identifying and isolating segments of speech from other sounds or signals contained within the audio. Such techniques have associated advantages and disadvantages in terms of computational resource efficiency, processing speed, complexity of use, applicability, and accuracy.

SUMMARY

Speech detection can be achieved by identifying a speech segment within an audio segment using image classification. According to an example, an audio segment of radio communications is obtained. An audio sub-segment within the audio segment is extracted. A sampled histogram is generated of a plurality of sampled values across a sampled time window of the audio sub-segment. A two-dimensional image is generated that represents a two-dimensional mapping of the sampled histogram along a first dimension and a predefined histogram along a second dimension that is orthogonal to the first dimension. The two-dimensional image is provided to an image classifier previously trained using the predefined histogram. An output is received from the image classifier based on the two-dimensional image. The output indicates whether the audio sub-segment contains speech.

The features and techniques discussed in this summary can be provided independently in various examples or may be combined in yet other examples, further details of which are described with reference to the following description and drawings.

BRIEF DESCRIPTION OF THE DRAWINGS

FIG. 7 is a flow diagram depicting an example method for obtaining and using an audio segment with the method of FIG. 2 or for training an image classifier with the method of FIG. 8.

FIG. 8 is a flow diagram depicting an example method 800 for training the image classifier used with method 200 of FIG. 2.

DETAILED DESCRIPTION

Figure 1:
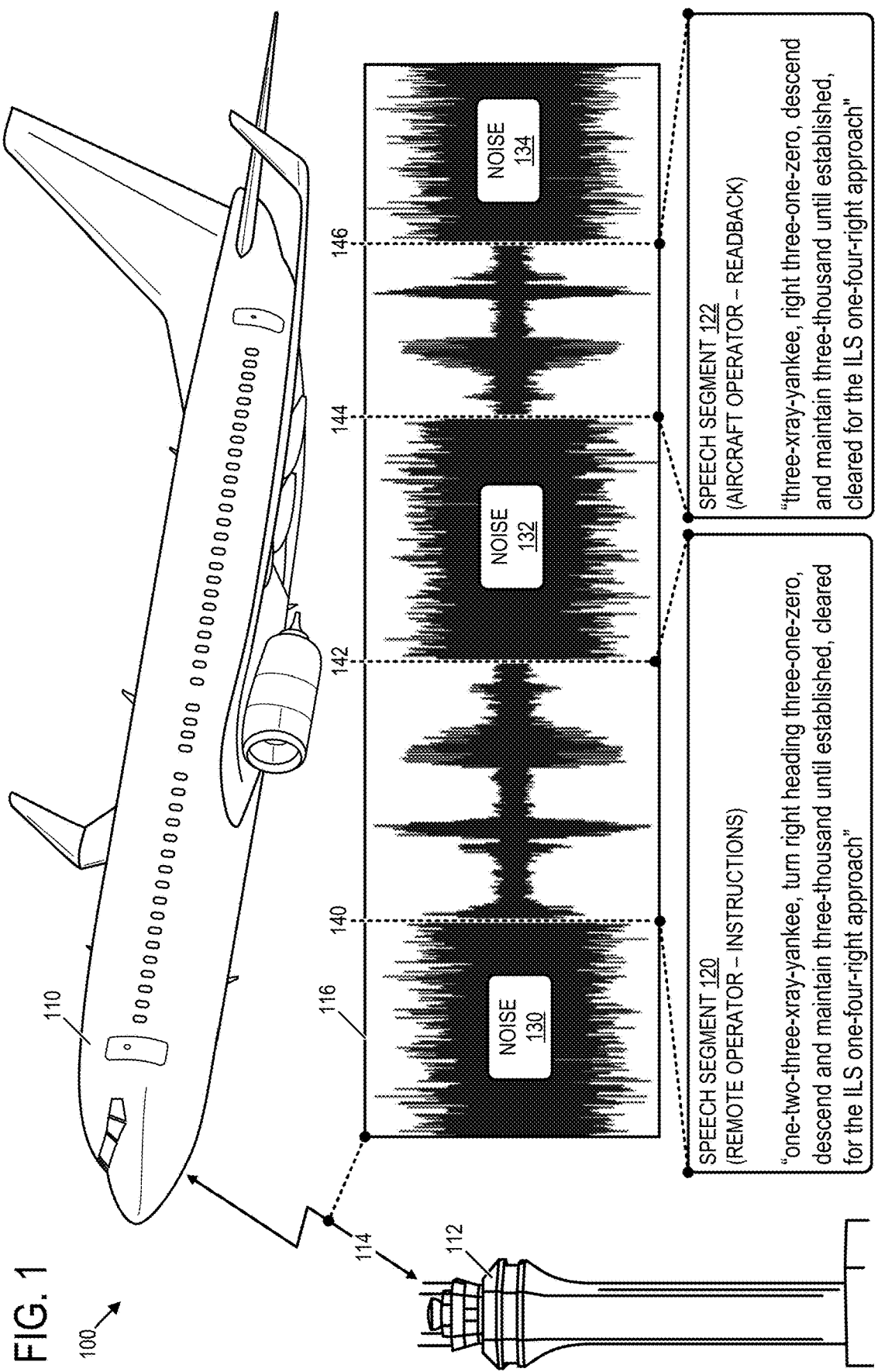
FIG. 1 depicts an example of communications between an aircraft and a remote source.

One example of the use of speech recognition is in Radio communications that are used in a variety of contexts to convey speech or other audio content. Other speech recognition applications are contemplated, but for clarity, discussed in reference to radio communication herein. As an example, aircraft pilots and other crew members on-board an aircraft (collectively "aircraft operators") can communicate verbally with remote operators such as air traffic control (ATC), airline operations centers (AOCs), and other aircraft via radio communications. Within this context, speech contained in such radio communications can include instructions spoken by remote operators and readback of the instructions spoken by aircraft operators, as one example. Radio communications can also include noise as the predominant signal during periods of time when speech or other audio content is not present within the radio communications.

A technical advantage of the disclosed subject matter includes overcoming the challenge of unsupervised machine-implemented segmentation of speech segments from real-world radio communications, such as those used within the context of airport VHF radio environments. ATC radio channels can be recorded on a continuous streaming basis during airport hours of operation so that, for example, key parts of a clearance dialogue history can be captured, retained, and cataloged. A typical busy airport environment can utilize 20-50 short audio clearances per hour on each active "ground" or "tower" frequency channel. After digitizing and storing these audio streams, it can be beneficial to use a machine-implemented automated parser to intelligently separate these audio streams into clearance segments to be used for downstream processes such as automatic speech recognition (ASR) and natural language processing (NLP). Accurate real-time ATC clearance text segments can be valuable for a wide variety of intelligent air traffic management and logging tasks including use with automated flight applications, as an example.

The approaches disclosed herein can leverage band-pass frequency filtering and time domain analysis combined with a bivariate probability distribution technique to create two-dimensional image representations as a function of sampled window vectors of audio communications. These image representations (also referred to herein by the expression "g(p,q)") can be used to train an image classifier (e.g., including a Deep Neural Network (DNN)) and create a model for inferring a binary classification of [noise, speech]

from unknown continuous streams of audio. A downstream non-linear filtering technique can be applied to the temporal binary classification stream in order to accurately segment speech segments appropriate to the length of typical conversational dialogue (e.g., between pilots and ATC controllers). However, the features and techniques disclosed herein can be applied within other contexts of speech detection and segments.

The approaches disclosed herein recognize a similarity between the probability density function (PDF) of a normal random process and the PDF of sampled noise from typical ATC audio communication signals transmitted via radio communications. However, there can be a low similarity between the normal random process and a speech signal PDF. As summarized above, subtle parameters such as highly variable energy between different transmitters and receivers can make it difficult to generalize a particular approach for classification of noise vs. speech. A convenient way to represent these different PDFs is to make use of scatter plots to represent a PDF covariance matrix as a 2-D image.

In this example, image color is not required as the intensity and shape of the resulting joint distribution between the normal random distribution vs signal under examination can be of particular interest. The image shape and intensity can be readily recognizable as either noise or speech by a suitably trained image classifier incorporating a machine vision model. As an illustrative example, it may be possible for an image classifier to be successfully trained to 98% accuracy based on as few as 6,000 noise vs. speech audio samples.

According to an example, speech detection can be achieved by identifying a speech segment within an audio sample using image classification. The audio sample can include an audio segment of radio communications, as an example. A plurality of audio sub-segments are extracted from the audio segment that form a sequence of sampled time windows within the audio segment.

For each audio sub-segment of the plurality of audio sub-segments: a sampled histogram is generated of a plurality of sampled values across the sampled time window of the audio sub-segment; a two-dimensional image is generated that represents a two-dimensional mapping of the sampled histogram along a first dimension and a predefined histogram along a second dimension that is orthogonal to the first dimension; the two-dimensional image is provided to an image classifier that was previously trained using the predefined histogram; and an output is received from the image classifier that is based on the two-dimensional image in which the output indicates whether the audio sub-segment contains speech.

Based on the output received from the image classifier for the plurality of audio sub-segments, a beginning and an ending of a speech segment within the audio segment can be identified. One or more identifiers indicating the beginning and the ending of the speech segment within the audio segment can be output for use by downstream processes, such as further refinement of the speech segment, segmentation of the speech segment, trimming of the audio segment, and application of a variety of speech processing techniques such as automatic speech recognition and natural language processing, as a few examples.

While the features and techniques of the subject application describe speech detection with respect to audio transmitted and received via radio communications, it will be understood that the disclosed features and techniques can be suitably applied to other forms of audio that are not necessarily transmitted via radio communications. Furthermore, the term "speech", as used herein, can include human-generated speech as well as machine-generated speech or other forms of synthesized speech. Audio to which the disclosed features and techniques can be suitably applied can include previously recorded, near-real-time, or live audio formats. While the disclosed features and techniques are described as being applied within the context of aircraft operations, it will be understood that these features and techniques can be suitably applied to audio used within other contexts or fields.

FIG. 1 shows an example of communications 100 between an aircraft 110 and a remote source 112 that contains speech. Remote source 112 can refer to the ATC, the AOC, or another aircraft operator of a different aircraft, as examples. Within FIG. 1, aircraft 110 is an example of a mobile platform that takes the form of a commercial passenger aircraft. Aircraft 110 can take other forms. Verbal communications in the form of speech between the aircraft operator of aircraft 110 and the remote operator of remote source 112 are provided in this example via radio communications 114. Example audio 116 carried by radio communications is represented in FIG. 1 as including speech segments 120 and 122 interspersed in time by noise 130, 132, 134, etc.

The remote operator, in this example, provides instructions within first speech segment 120 of audio 116, for example, by speaking the phrase (e.g., after identifying a model type of the aircraft) "one-two-three-xray-yankee, turn right heading three-one-zero, descend and maintain three-thousand until established, cleared for the ILS one-four-right approach" into a microphone (e.g., of a headset). Alternatively, first speech segment 120 can refer to speech of a pre-recorded audio message. An instance of first speech segment 120 is transmitted by remote source 112 within radio communications 114, which can be received by aircraft 110 and presented to the aircraft operator. Within the example of FIG. 1, a beginning 140 and an ending 142 of first speech segment 120 are shown within audio 116.

The aircraft operator, in this example, provides readback by second speech segment 122 responsive to the remote operator's instructions of first speech segment 120 by speaking the phrase "three-xray-yankee, right three-one-zero, descend and maintain three-thousand until established, cleared for the ILS one-four-right approach" into a microphone (e.g., of a headset). Alternatively, second speech segment 122 can refer to speech of a pre-recorded audio message. An instance of second speech segment 122 can be transmitted by aircraft 110 within radio communication 114, which can be received by and presented at remote source 112. Within the example of FIG. 1, a beginning 144 and an ending 146 of second speech segment 122 are shown within audio 116.

Using the features and techniques of the present disclosure to detect and isolate speech within audio, speech contained within an instance of first speech segment 120 can be presented to the aircraft operator and/or other crew members on-board aircraft 110 in a variety of ways. As an example, speech contained within first speech segment 120 can be audibly output via an audio speaker (e.g., of a headset or other audio speaker) located on-board aircraft 110. Additionally or alternatively, speech contained within first speech segment 120 can be converted to a text representation of that speech and visually output via a graphical display device (e.g., within a cockpit of aircraft 110), which can improve situational awareness of aircraft operators. In still further examples, speech contained with first speech segment 120 can be converted into a data representation for use by flight services applications, programs, or hardware on-board the aircraft.

Similarly, speech contained within an instance of second speech segment 122 can be presented at the remote source in a variety of ways. As an example, second speech segment 122 can be audibly output via an audio speaker (e.g., of a headset or other audio speaker) located off-board aircraft 110. Additionally or alternatively, speech contained within second speech segment 122 can be converted to a text representation of that speech and visually output via a graphical display device (e.g., located off-board aircraft 110), which again can improve situational awareness of remote operators. In still further examples, speech contained with second speech segment 122 can be converted into a data representation for use by flight services applications, programs, or hardware off-board the aircraft.

Text representations generated from speech contained within speech segments, such as 120 and 122, can take the form of verbatim text representations or structured text representations of the speech, as examples. As another example, data representations generated from such speech can be propagated to flight data services, including computer programs executed on-board the aircraft and off-board the aircraft. Updated data obtained from such speech can be graphically depicted within navigational charts and procedures presented via a graphical user interface to visually identify changes to the data of the flight data service.

Figure 2:
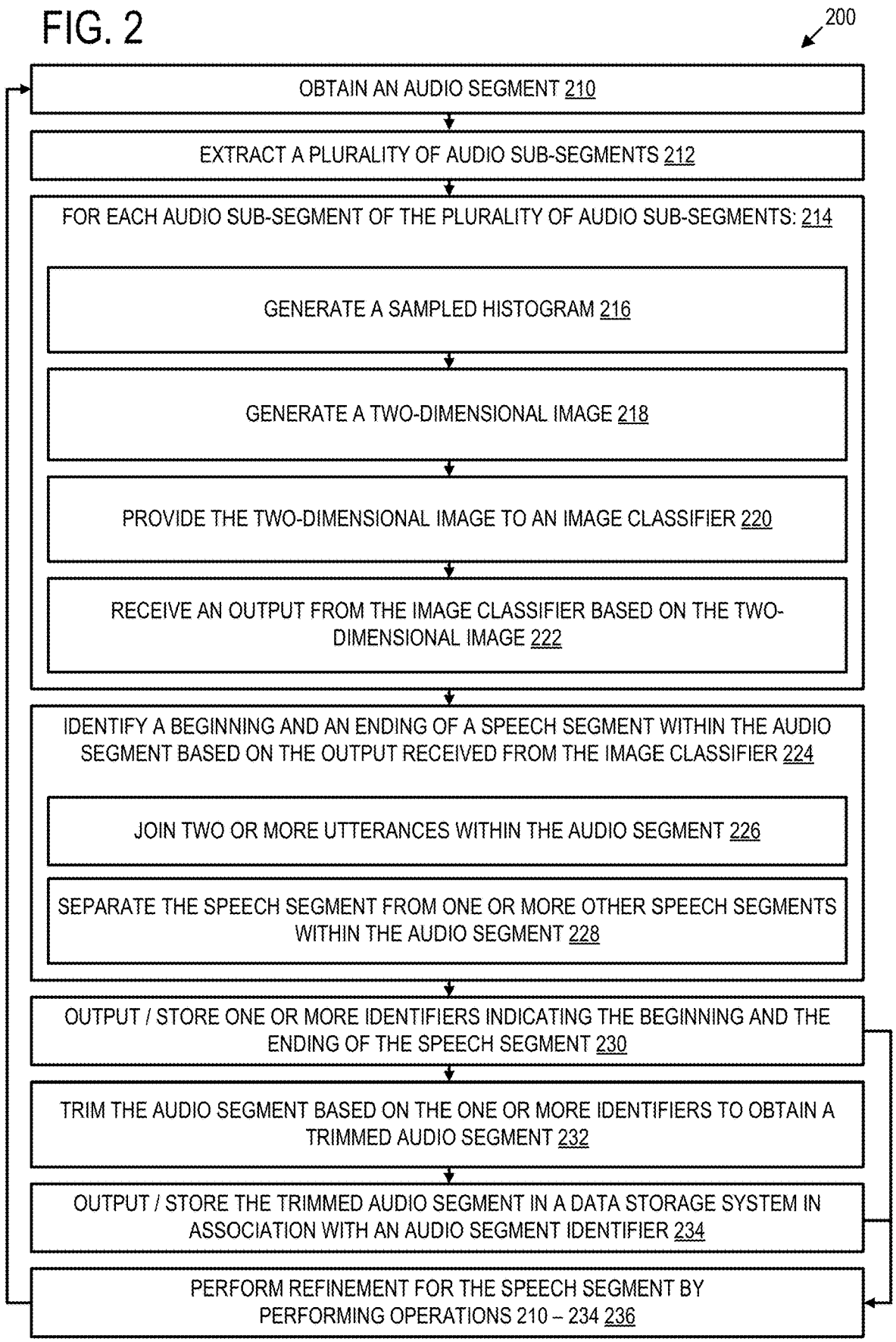
FIG. 2 is a flow diagram depicting an example method for identifying a speech segment within an audio sample.

FIG. 2 is a flow diagram depicting an example method 200 for identifying a speech segment within an audio sample. Method 200 can be performed by a computing system of one or more computing devices. One or more computing devices of the computing system can be located on-board a mobile platform, such as aircraft 110 of FIG. 1, as an example. Additionally or alternatively, one or more computing devices of the computing system can be located off-board the mobile platform in a distributed or standalone configuration. An example computing system that can perform method 200 is described in further detail with reference to FIG. 10.

At 210, the method includes obtaining an audio segment. In this example, the audio segment includes or is derived from an audio sample within which one or more speech segments can be identified and extracted. In at least some examples, the audio segment can represent an audio sample of radio communications, such as described with reference to communications 114 of FIG. 1. FIG. 7 describes additional details relating to the capture and pre-processing of audio samples to obtain audio segments as part of operation 210.

At 212, the method includes extracting a plurality of audio sub-segments. As an example, the plurality of audio sub-segments form a sequence of sampled time windows of a defined duration within the audio segment obtained at operation 210. As an example, the audio segment can have a duration (e.g., 15 minutes) and each sampled time window of the audio segment can be of a defined shorter duration (e.g., 1 second, 100 milliseconds, 10 milliseconds, etc.). Thus, the plurality of audio sub-segments can include tens, hundreds, thousands, millions, or more sub-segments, each having a respective temporal position within a sequence of the sampled time windows that collectively form the audio segment. The duration of the sampled time window can be selected to provide relatively coarse or fine resolution of the audio segment.

Aspects of method 200 can be performed using multiple passes of increasing resolution by successively reducing the duration of the sampled time window. Additionally or alternatively, method 200 can be performed using multiple passes of decreasing stride by successively reducing the duration of the stride for the samples. Thus, it will be understood that resolution can be increased over successive passes through method 200 by reducing a duration of the time window and/or by reducing the duration of the stride value at which samples are obtained.

At 214, for each audio sub-segment of the plurality of audio sub-segments, the method can include performing operations 216-222. Thus, for example, thousands of audio sub-segments can be processed by performing operations 216-222 thousands of times for those sub-segments.

At 216, the method includes generating a sampled histogram. As an example, the sampled histogram generated at 216 is of a plurality of sampled values across the sampled time window of the audio sub-segment. The sampled values can be spaced at regular time intervals (i.e., a stride) within the sampled time window. As an example, a stride having a duration of 100 milliseconds within a time window having a duration of 1 second can be used to generate a sampled value at each 100 millisecond interval within the 1 second sampled time window. In at least some examples, the plurality of sampled values represent points along the audio waveform at predefined intervals of time. The sampled histogram can include a plurality of intervals spanning an overall range of the sampled values. Each interval of the sampled histogram can have an associated count of the plurality of sampled values that are within that interval. The sampled histogram can represent a count of tens, hundreds, thousands, millions, or more sampled values for each of the plurality of intervals across the overall range of the sampled histogram, depending on the stride and duration of the sampled time window.

At 218, the method includes generating a two-dimensional image. As an example, the two-dimensional image (g(p,q)) represents a two-dimensional mapping of the sampled histogram (e.g., a sampled probability density function also referred to by the variable "p") of the audio sub-segment along a first dimension and a predefined histogram (e.g., a reference probability density function also referred to by the variable "q") along a second dimension that is orthogonal to the first dimension. As an example, the two-dimensional image can take the form of a scatter plot that provides graphical representation of a covariance matrix or joint distribution matrix of the sampled histogram and the predefined histogram.

The predefined histogram can represent or model a representative sample of an audio sub-segment that contains a particular audio feature (e.g., noise) that is to be distinguished from speech and that does not contain speech. As another example, the predefined histogram can represent a sampled histogram of a plurality of sampled values across a sampled time window of a reference audio sub-segment of noise or other audio feature to be distinguish from speech and that does not contain speech. In at least some examples, noise can be modeled by the predefined histogram representing a normal or Gaussian distribution. In further examples, the predefined histogram can take other suitable forms provided that the same predefined histogram is consistently used for each audio sub-segment of the plurality of audio sub-segments from which the two-dimensional images are generated at operation 218. The predefined histogram described with reference to operation 218 is described in further detail with reference to FIG. 8.

Figure 3:
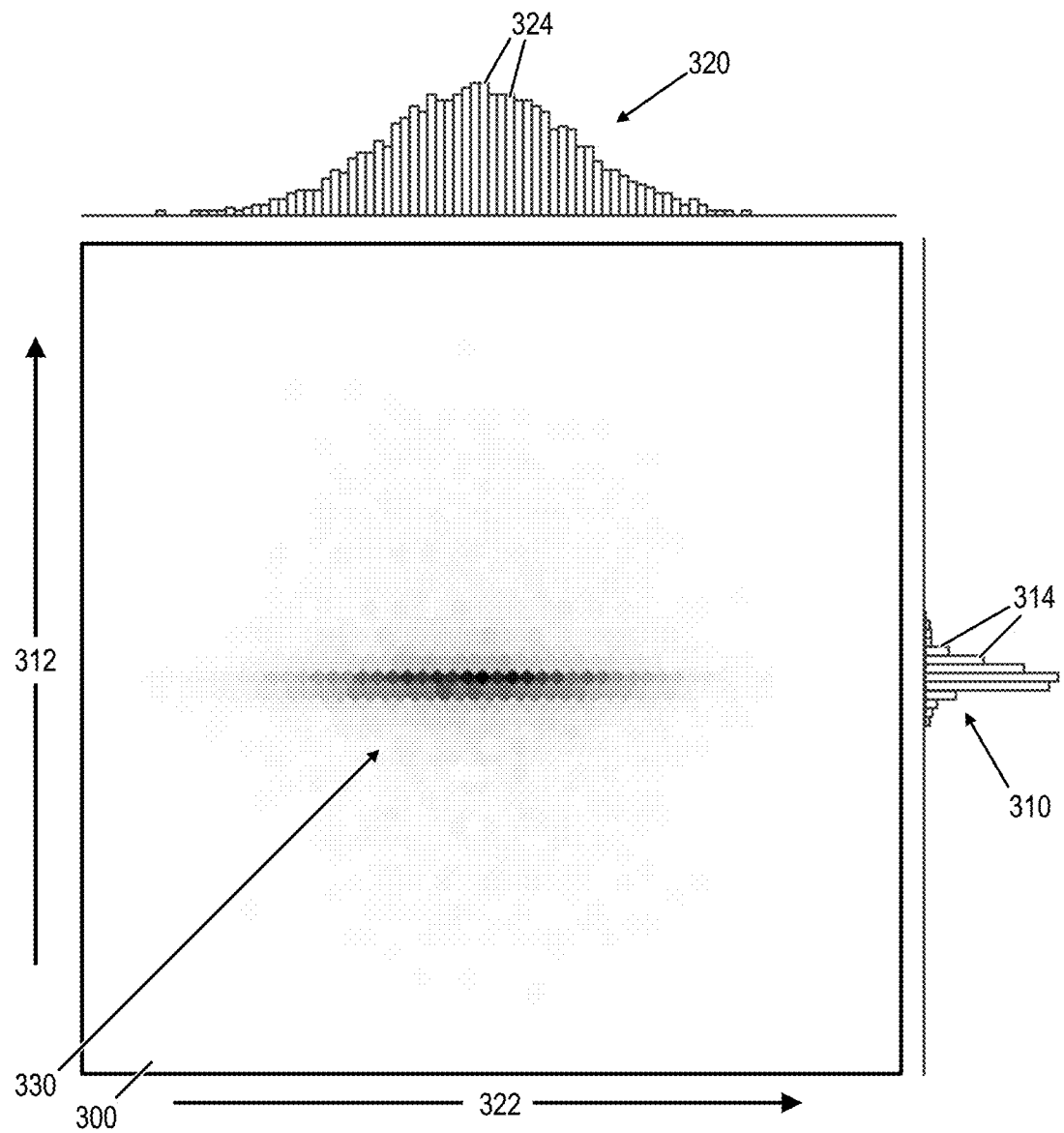
FIG. 3 depicts an example of an image that can be generated from audio that contains speech.
Figure 4:
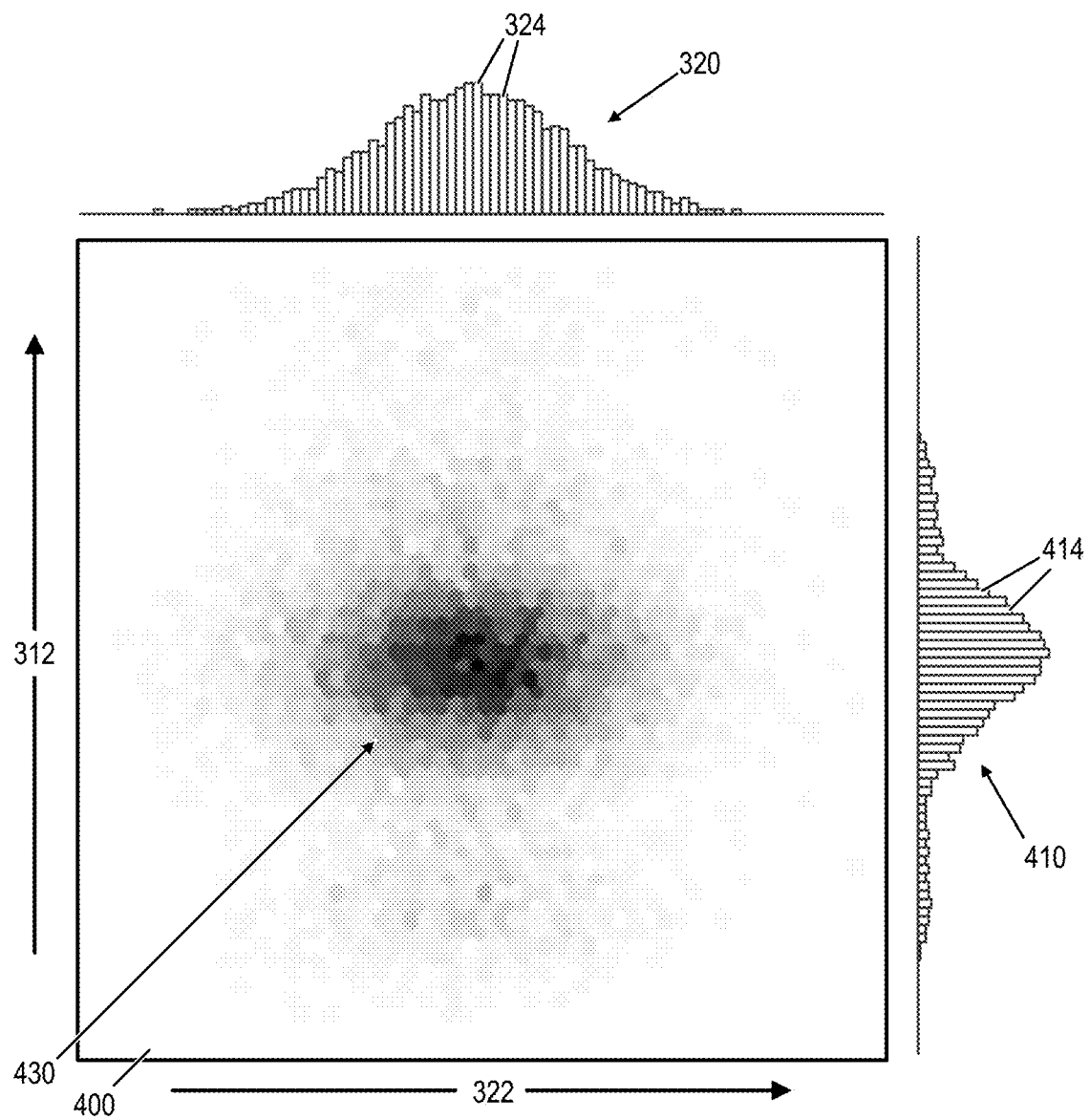
FIG. 4 depicts an example of an image that can be generated from audio that contains noise, but does not contain speech.

Examples of two-dimensional images that can be generated at operation 218 are depicted in FIGS. 3 and 4. FIG. 3 depicts an example two-dimensional image 300 that represents a two-dimensional mapping of a sampled histogram 310 of an audio sub-segment containing speech along a first dimension 312 and a predefined histogram 320 (e.g., representing an audio sub-segment containing noise, but not containing speech) along a second dimension 322 that is orthogonal to first dimension 312. In this example, the two-dimensional mapping of two-dimensional image 300 forms a graphical representation 330 (e.g., a scatter plot) having a generally elongated shape that has a greater length along second dimension 322 as compared to first dimension 312. Also within FIG. 3, individual intervals 314 of sampled histogram 310, and individual intervals 324 of predefined histogram 320 are depicted.

FIG. 4 depicts an example two-dimensional image 400 that represents a two-dimensional mapping of a sampled histogram 410 of an audio sub-segment containing noise (but not speech) along first dimension 312 and predefined histogram 320 (e.g., representing an audio sub-segment containing noise, but not containing speech) along second dimension 322 that is orthogonal to first dimension 312.

It will be understood that for purposes of comparison with image 300 that sampled histogram 410 has the same scaling as sampled histogram 310 along first dimension 312, and that the predefined histogram 320 has the same scaling along second dimension 322 in both images. In contrast to graphical representation 330 of two-dimensional image 300 of FIG. 3 for speech contained within an audio sub-segment, the two-dimensional mapping of two-dimensional image 400 forms a graphical representation 430 having a shape that is less elongated and more closely representative of a circle or centralized cluster as compared to graphical representation 330 of two-dimensional image 300. Also within FIG. 4, individual intervals 414 of sampled histogram 410, and individual intervals 324 of predefined histogram 320 are depicted.

The image representations generated by operation 218 and associated techniques rely, at least in part, on the observation that noise samples at different SNR or intensities can often exhibit the same or similar Gaussian character. The image representations of these signals demonstrates the signal amplitude invariance and robustness, which contributes to the broad generalizability of the speech end point detection and activity discrimination.

Referring again to FIG. 2, at 220, the method includes providing the two-dimensional image to an image classifier. In at least some examples, the image classifier was previously trained using the predefined histogram in combination with sampled histograms obtained from audio sub-segments as training data.

As one example, the image classifier can take the form of a binary image classifier that outputs an indication of whether the image provided as input at 220 represents an audio sub-segment containing speech. For example, the image classifier can output the indication as a voice activity detection (VAD) value that either has the value of "1" to indicate that the image represents an audio sub-segment containing speech or the value of "0" to indicate that the image represents an audio sub-segment that does not contain speech (e.g., instead contains noise or other suitable non-speech audio feature). Aspects of the image classifier and associated training are described in further detail with reference to FIGS. 8 and 9.

At 222, the method includes receiving an output from the image classifier based on the two-dimensional image. As described by the preceding example, the output can indicate whether the audio sub-segment contains speech by providing a VAD value that is either e.g., —a value of "1" to indicate the presence of speech in the audio sub-segment from which the image was generated or e.g., —a value of "0" to indicate that speech is not present within the audio sub-segment from which the image was generated. While values "1" and "0" are used in this example, it will be understood that other suitable values can be used to indicate whether an image input to the image classifier represents speech contained within an audio sub-segment.

At 224, the method includes identifying a beginning and an ending of each speech segment within the audio segment based, at least in part, on the output received from the image classifier for the plurality of audio sub-segments.

In at least some examples, as part of operation 224, the method can include identifying the beginning and the ending of the speech segment within the audio segment by, at 226, joining two or more utterances within the audio segment. As an example, two or more utterances within the audio segment that are separated in time by less than a threshold duration can be joined to form the speech segment.

Furthermore, in at least some examples, as part of operation 224, the method can include identifying the beginning and the ending of the speech segment within audio segment by, at 228, separating the speech segment from one or more other speech segments within the audio segment. As an example, the speech segment can be separated from one or more other speech segments based on two or more utterances within the audio segment being separated in time by more than a threshold duration.

As an example described in further detail with reference to FIGS. 5 and 6, the speech segmentation results provided by operation 224 can be achieved by performing non-linear time series binary filtering using a segmentation state machine. In this example, the segmentation state machine receives VAD values from operation 222 as respective voice activity detection input (VAD_IN) values and generates a corresponding voice activity detection output (VAD_OUT) value for each VAD_IN value according to a defined process. Where filtering is performed as part of operation 224, a given VAD_IN value can remain unchanged (e.g., a value of "1" can remain the value of "1" or the value of "0" can remain the value of "0") or can be modified (e.g., the value of "1" can be changed to the value of "0" or vice-versa) within the VAD_OUT values corresponding to those VAD_IN values. The beginning and the ending of each speech segment within the audio segment can be indicated by transitions of the VAD_OUT values (e.g., from a value of "1" to a value of "0" or vice-versa). In at least some examples, the segmentation state machine can assign speech segment identifiers to each speech segment that is detected within the audio segment based on the VAD_OUT values, thereby enabling speech segments to be individually referenced, stored, trimmed, and tracked among an audio segment that contains many speech segments.

At 230, the method includes outputting one or more identifiers indicating the beginning and the ending of the speech segment within the audio segment, along with the VAD_OUT values. As described in the preceding example, the segmentation state machine can output identifiers indicating the beginning and the ending of each speech segment identified within the audio segment based, at least in part, on the output received from the image classifier for the plurality of audio sub-segments. Alternatively or additionally, the method at 230 can include storing the one or more identifiers indicating the beginning and the ending of the speech segment and the raw sequence of VAD_OUT values. The one or more identifiers indicating the beginning and the ending of the speech segment can be stored in a data storage device in association with an audio segment identifier of the audio segment as well as in association with a speech segment identifier. The one or more identifiers indicating the beginning and the ending of the speech segment can be retrieved from the data storage device for subsequent processing or use by referencing the audio segment identifier, the speech segment identifier, or a combination thereof.

At 232, the method includes trimming the audio segment based on the one or more identifiers output or stored at 230, which indicate the beginning and the ending of the speech segment to obtain a trimmed audio segment that contains the speech segment. The trimmed audio segment that contains the speech segment is of a reduced duration as compared to the audio segment prior to being trimmed.

At 234, the method includes outputting the trimmed audio segment. Alternatively or additionally, the method at 234 includes storing the trimmed audio segment in a data storage device in association with an audio segment identifier and/or a speech segment identifier. The trimmed audio segment can be retrieved from the data storage device for subsequent processing or use by referencing the audio segment identifier, the speech segment identifier, or a combination thereof.

In at least some implementations, further refinement can be performed for the speech segment by again performing operations 212-234 on the trimmed audio segment from operation 234 using smaller time windows for extracting audio sub-segments as compared to the time windows initially used at operation 212. Alternatively, at 236, further refinement can be performed for the speech segment by again performing operations 212-234 using the portion of the audio segment that corresponds to the beginning and the ending of the speech segment, as indicated by the one or more identifiers received from operation 230, again using the smaller time windows for the audio sub-segments.

As an example of refinement that can be performed for the speech segment or its corresponding trimmed audio segment, each sampled time window of the plurality of audio sub-segments that was initially performed at operation 212 can be of a first duration of time (e.g., 100 milliseconds or other suitable duration of time). As part of refinement of the speech segment, the method can include performing operation 212 again by extracting a second plurality of audio sub-segments forming a sequence of sampled time windows within a reduced duration of the audio segment that includes at least the speech segment (e.g., the trimmed audio segment obtained at operation 234 or the portion indicated by the beginning and the ending of the speech segment obtained at operation 230). Each sampled time window of the second plurality of audio sub-segments (i.e., the refined audio sub-segments) can be of a second duration of time that is less than the first duration of time. Accordingly, each audio sub-segment of the second plurality of audio sub-segments may be referred to as a refined audio sub-segment.

Additionally, as part of refinement of the speech segment, the method further includes, at 214, performing operations 216-222 again for each audio sub-segment of the second plurality of audio sub-segments. Thus, at operation 216, the method includes generating a refined sampled histogram of a plurality of sampled values across the sampled time window of the refined audio sub-segment; at operation 218, the method includes generating a refined two-dimensional image that represents a refined two-dimensional mapping of the refined sampled histogram along the first dimension and the predefined histogram along the second dimension that is orthogonal to the first dimension; at operation 220, providing the refined two-dimensional image to the image classifier; and at operation 222, receiving a refined output from the image classifier based on the refined two-dimensional image that indicates whether the audio sub-segment (i.e., the refined audio subsequent) contains speech (or alternatively contains noise).

Furthermore, as part of refinement of the speech segment, at operation 224, the method further includes identifying a refined beginning and a refined ending of the speech segment within the audio segment based on the refined output received from the image classifier for each audio sub-segment of the second plurality of audio sub-segments; at operation 230, the method further includes outputting and/or storing one or more refined identifiers indicating the refined beginning and the refined ending of the speech segment within the audio segment.

At operation 232, the method further includes trimming the audio segment (or the previously trimmed audio segment) based on the one or more refined identifiers indicating the refined beginning and the refined ending of the speech segment to obtain a trimmed audio segment of reduced duration that contains the speech segment.

At operation 234, the operation further includes outputting and/or storing the trimmed audio segment based on the one or more refined identifiers in a data storage device in association with an audio segment identifier. While refinement in the preceding example is described as being performed by a second pass through operations 212-234, it will be understood that two or more refinement stages may be performed using consecutively smaller and smaller time windows for the audio sub-segments as part of operation 212.

Figure 5:
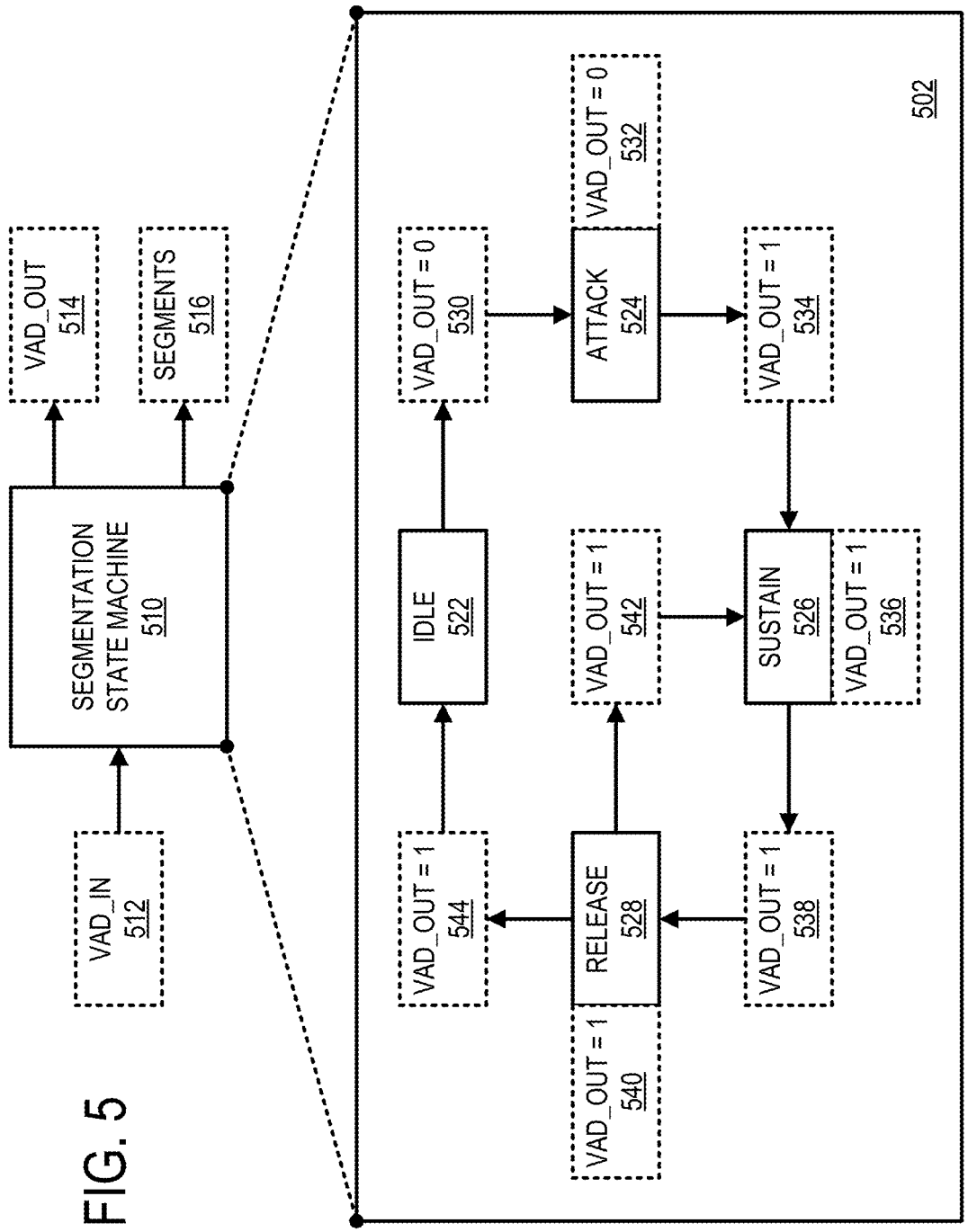
FIG. 5 depicts an example of non-linear time series binary filtering that can be performed as part of the method of FIG. 2.

FIG. 5 depicts an example of non-linear time series binary filtering that can be performed as part of operations 224-230 of FIG. 2. As an example, segmentation state machine 510 can perform a non-linear time series binary filtering process 502. Within FIG. 5, segmentation state machine 510 time-sequentially processes the VAD_IN values obtained at operation 222 of FIG. 2 as a time-varying VAD_IN signal 512 by performing process 502 to obtain a time-varying VAD_OUT signal 514 that includes VAD_OUT values corresponding to filtered VAD_IN values. Additionally, segmentation state machine 510 can identify the beginning and the ending of each speech segment contained in the subject audio segment as corresponding to transitions between VAD_OUT values within VAD_OUT signals 514, depicted in FIG. 5 as speech segments 516.

As part of process 502, segmentation state machine 510 can initiate and transition between or among various states including an idle state 522, an attack state 524, a sustain state 526, and a release state 528. Process 502 can begin in idle state 522 and then transition to attack state 524 by initializing the VAD_OUT signal 514 to a value of "0" (indicating speech is not present within this example binary classification system) at 530. Additionally, at 530, attack and release counters can be initialized to respective time constants at 526. As an example, at 530, an attack counter (attack_count) can be set equal to an attack time constant (attack_tc), and a release counter (release_count) can be set equal to a release time constant (release_tc). These time constants define a duration of time or a quantity of VAD_IN values (value units that each correspond to a time window of a particular duration) of the VAD_IN signal 512 to be referenced during the attack state 524 and the release state 528.

While in the attack state 524, the VAD_OUT signal 514 maintains a value of "0" (indicating speech is not present) at 532. Additionally, at 532, state machine 510 judges whether the duration defined by attack_tc for attack_count has concluded. As an example, attack_tc can be defined to have a value of one value unit. In this example, attack_count can be decremented from a value of one to a value of zero upon processing one VAD_IN value to a VAD_OUT value. The attack state 524 persists until the VAD_IN signal 512 maintains a value of "1" (indicating the presence of speech within this example binary classification system) for the duration of attack_tc. Once the duration of attack_tc concludes while the input VAD signal has remained at the value of "1" over that duration, process 502 transitions from the attack state 524 to the sustain state 526, and state machine 510 asserts the VAD_OUT signal 516 to have a value of "1" at 534. Otherwise, the VAD_OUT signal 514 remains a value of "0" within the attack state 524. Additionally, at 534, a new speech segment is initiated, for example, by creating a record that includes an associated speech segment identifier and an identifier (e.g., a time value or a sequence identifier for a VAD value within a sequence of VAD values) that indicates the beginning of the speech segment.

In the sustain state 526, the VAD_IN signal 512 is monitored, and the VAD_OUT signal 514 is maintained at a value of "1" and the speech segment is identified as persisting at 536. As long as the VAD_IN signal 512 maintains a value of "1" (indicating the presence of speech), the filtered VAD_OUT signal 514 will also remain the value of "1" (indicating the presence of speech). If the VAD_IN signal 512 transitions to a value of "0" (indicating speech is not present), process 502 can transition from the sustain state 526 to the release state 528 where the VAD_IN signal will continue to be monitored.

As part of the transition to the release state 528, the VAD_OUT signal 514 is maintained at a value of "1" as indicated at 538. While operating in the release state 528, the VAD_OUT signal 514 is maintained at a value of "1" and state machine 510 judges whether the duration defined by release_tc for release_count has concluded as indicated at 540. As an example, release_tc can have a value of three value units or other suitable value. Additionally, while operating in the release state 528, if the VAD_IN signal 512 transitions from a value of "0" back to a value of "1" before the duration of release_tc for release_count concludes, process 502 transitions back to the sustain state 526 and asserts the filtered VAD_OUT signal 514 to have a value of "1" at 542, which identifies the current speech segment as persisting. While operating in the release state 528, if the duration of release_tc for release_count concludes while the VAD_IN signal 510 maintains a value of "0" (indicating speech is not present), the VAD_OUT signal 514 is asserted to a value of "0" (indicating speech is not present) at 544, which indicates an ending of the current speech segment. Additionally, process 502 transitions to the idle state 522, where process 502 can be repeated to identify a subsequent speech segment, if present.

In at least some examples, segments 516 indicated by segmentation state machine can take the form of a segment dictionary (SegDict) that is a data structure that can be computed at the same time as the execution of process 502. Once the SegDict is completed (e.g., after the full temporal traversal of the audio segment), then a separate module (e.g., a segment builder and file write module) can segment each of the speech segments as audio files and write them to data storage.

Once coarse segments have been written to data storage, a subsequent operation can be performed to reprocess coarsely identified segments into higher resolution VAD outputs and further discriminate the beginning and end points of the speech segments. A finer classification VAD output sequence can be reprocessed again through the state machine or used to derive a higher precision head and tail of the coarse segment. A trimming module can then scan the head and tail of the speech segment for additional noise segments that can be trimmed off of the beginning and end. The trimmed segments are then stored in data storage ready for transcription processing or other forms of processing.

Figure 6A:
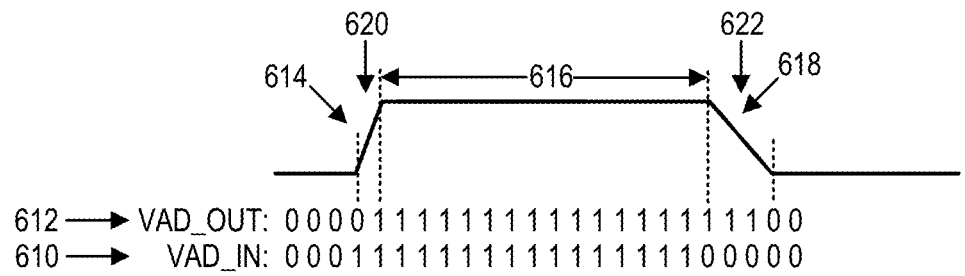
FIGS. 6A-6C depict the filtering process of FIG. 5 being applied to example voice activity detection input signals to obtain example filtered voice activity detection output signals.
Figure 6B:
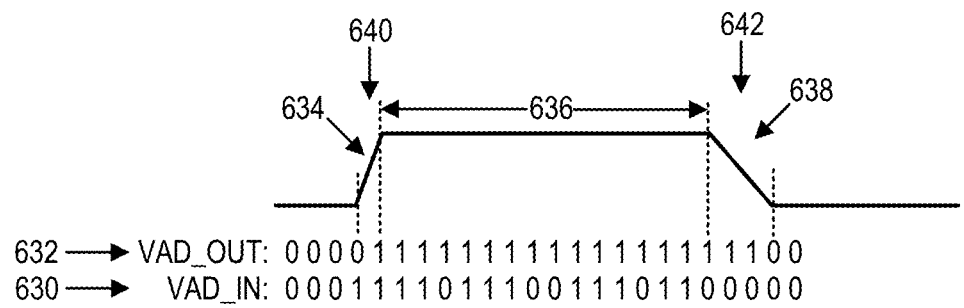
Figure 6C:
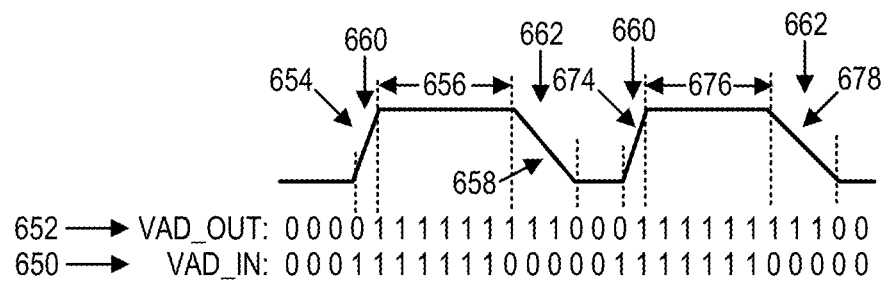

FIGS. 6A-6C depict process 502 of FIG. 5 being applied to example VAD_IN signals by segmentation state machine 510 to obtain filtered VAD_OUT signals. In these examples, the value "1" within VAD_IN and VAD_OUT signals refers to the presence of speech within a time window of an audio segment, and the value "0" refers to speech not being present within a time window of an audio segment (e.g., noise is instead present). Additionally, in these examples, attack_tc previously described with reference to FIG. 5 is defined to be a duration of one unit value of the VAD_IN signal (i.e., the corresponding duration of one time window) and release_tc is defined to be a duration of three unit values of the VAD_IN signal (i.e., the corresponding duration three time windows).

Referring to FIG. 6A, a VAD_IN signal 610 having a time-based sequence of VAD_IN values is shown alongside a resulting filtered VAD_OUT signal 612 having a time-based sequence of VAD_OUT values. In this example, an attack state 614 is followed by a sustain state 616 that concludes with a release state 618. The use of an attack_tc of one unit value of the VAD_IN signal and a release_tc of three unit values of the VAD_IN signal are depicted in FIG. 6A at 620 and 622, respectively. The result of the filtering performed in FIG. 6A is a single speech segment being detected.

Referring to FIG. 6B, a VAD_IN signal 630 having a time-based sequence of VAD_IN values is shown alongside a resulting filtered VAD_OUT signal 632 having a time-based sequence of VAD_OUT values. In this example, an attack state 634 is again followed by a sustain state 636 that concludes with a release state 638. The use of an attack_tc of one unit value of the VAD_IN signal and a release_tc of three unit values of the VAD_IN signal are depicted in FIG. 6B at 640 and 642, respectively. Furthermore, in this example, less than three consecutive VAD_IN values having a value of "0" of the VAD_IN signal 630 occur during the duration of the speech segment, which is less than the three unit values of the release_tc. Thus, the speech segment persists until the release_tc is attained. The result of the filtering performed in FIG. 6B is again a single speech segment being detected.

Referring to FIG. 6C, a VAD_IN signal 650 having a time-based sequence of VAD_IN values is shown alongside a resulting filtered VAD_OUT signal 652 having a time-based sequence of VAD_OUT values. In this example, an attack state 654 is followed by a sustain state 656 that concludes with a release state 658 corresponding to a first speech segment. The use of an attack_tc of one unit value of the VAD_IN signal and a release_tc of three unit values of the VAD_IN signal are depicted in FIG. 6B at 660 and 662, respectively. Additionally, in this example, another attack state 674 is followed by another sustain state 676 that concludes with another release state 678 corresponding to a second speech segment. Thus, the result of the filtering performed in FIG. 6B is two speech segments being detected.

FIG. 7 is a flow diagram depicting an example method 700 for obtaining and using an audio segment with method 200 of FIG. 2 or for training an image classifier with method 800 of FIG. 8 using the audio segment as training data. As an example, method 700 can be performed by a computing system as part of operation 210 of FIG. 2.

At 708, the method includes obtaining audio. As an example, the audio obtained at 708 is contained within communications (e.g., radio communications). As part of operation 708, the method at 710 can include receiving the communications containing the audio. Within the context of radio communications 114 of FIG. 1, weather and ATC clearance data from VHF radio communications at numerous towered airports in the United States during hours of operations can be received and recorded. Communication data can be obtained, for example, from Aerodrome Traffic Information Service (ATIS) broadcasts, Ground and Tower ATC VHF frequencies, etc.

At 712, the method includes storing (e.g., recording) the audio contained as a raw audio sample. As an example, the raw audio sample can be stored in a data storage device in association with one or more identifiers (e.g., geo-location identifier, aircraft identifier, remote source identifier, etc.) or other suitable metadata (e.g., time stamps) that describe aspects of the raw audio sample and the radio communications from which the raw audio sample was obtained. As described in further detail with reference to method 800 of FIG. 8, raw audio samples can be processed into training data. Any suitable quantity of raw audio samples can be received and stored to enable training of the image classifier.

At 714, the method includes processing the raw audio sample to obtain an audio segment. The audio segment obtained by processing the raw audio sample at operation 714 can be used with method 200 of FIG. 2 to obtain a trimmed audio segment or method 800 of FIG. 8 as part of training of the image classifier. As part of operation 714, the method can include one or more of the following: performing filtering of the raw audio data at 716, performing centering of the audio signal within the raw audio sample at 718, and performing trimming of the raw audio sample at 720. At 722, the method includes outputting and/or storing the pre-processed raw audio sample as the audio segment.

Filtering at operation 716 can include bandpass filtering. In order to provide for a balanced, centered and symmetric shape of p(x), DC wander from the signal can be removed without compromising frequencies that contribute to the time varying stochastic process nature of the audio speech signal. As an example, values $a_n$ and $b_n$ of the frequency response transfer function of equation 717 are computed for a direct-form infinite impulse digital bandpass filter with a lower stopband of 500 Hz and upper stopband of 1500 Hz. However, other suitable stopbands can be used where appropriate for a given environment. The input audio signal x(n) is therefore preprocessed with the filter H(z) yielding the output signal y(n) as an input to the computation of the signal probability distribution p(x).

At 724, the method can include using the audio segment for training of the image classifier, for example, by performing method 800 of FIG. 8 at 726. Alternatively, at 728, the method can include using the audio segment (e.g., within a field use deployment) to identify one or more speech segments using the previously trained image classifier, for example, by performing method 200 of FIG. 2 at 730.

FIG. 8 is a flow diagram depicting an example method 800 for training the image classifier used with method 200 of FIG. 2. Method 800 can be performed by a computing system, or at least in part by one or more human users (e.g., assigning training labels or confirming accuracy) in combination some operations of method 800 being performed by a computing system.

At 808, the method includes processing audio (e.g., audio 116 of radio communications 114 of FIG. 1) to obtain a set of training data that includes a plurality of two-dimensional images. Operations 810-818 can be performed as part of operation 808.

At 810, the method includes, for each audio segment of one or more audio segments contained in the audio, extracting a plurality of audio sub-segments forming a sequence of sampled time windows within the audio segment. As an example, operation 810 can be include performing previously described operations 210-216 of method 200 of FIG. 2 using an audio segment of the audio sample to obtain a plurality of sampled histograms from operation 216. For example, each histogram of the plurality of sampled histograms can be generated from respective audio sub-segments of the audio segment.

At 812, the method includes determining a probability density function that is representative of one or more of the sampled histograms that do not represent speech (e.g., noise). In other words, sampled histograms that are generated from audio sub-segments of the audio segment that do not contain speech can be used to determine the probability density function. For example, the probability density function of representative noise can be determined at 812.

At 814, the method includes generating the predefined histogram (as referenced by operation 218 of FIG. 2) based on the probability density function determined at operation 812. As an illustrative example, a 15-minute audio sample x(n) referenced in FIG. 7 is passed initially through the bandpass filter and centered as described above with respect to operations 716 and 718. The output of the bandpass filter y(n) can be passed to a windowing function whereby a window of m samples at a desired window duration to extract audio subsegments in accordance with operation 212 of FIG. 2. Following centering performed at operation 718, each of these vectors is demeaned to remove any local DC shift in the windowed vector. The probability density function can then computed on the result to obtain p(x) (i.e., PDF of the windowed vector of samples). The PDF of a standard normal distribution q(x) can be precomputed.

At 816, for each sampled histogram, the method includes generating a two-dimensional image. As an example, the two-dimensional image represents a two-dimensional mapping of the sampled histogram along the first dimension and the predefined histogram along the second dimension that is orthogonal to the first dimension. Operation 816 can be performed using the previously described approach of operation 218 of FIG. 2.

At 818, the method includes assigning a label to each two-dimensional image. As an example, the label assigned at operation 818 can identify the audio sub-segment (from which the sampled histogram of the image was generated) as containing speech or not containing speech (e.g., containing noise). For example, each image can be labeled as representing either speech or noise. Labels can be used as part of training of the image classifier.

In at least some examples, labels can be generated or proposed for assignment to their respective images using computational techniques in combination with at least some manual checking of labels. An example computational technique can rely on Kullback-Leibler (KL) Divergence analysis. Different entropies can be compared and quantified using the KL Divergence measure. While forming the covariance matrix of the two-dimensional images, the KL Divergence term can also be computed and the organization of the data can be stored in a dataframe for bookkeeping and additional timeseries processing. Each row in the dataframe can store metadata for the two-dimensional image data representation g(p,q) used for machine learning inference f(g(p,q)). The KL Divergence term can be measured using equation 819, as an example.

At 819, the method includes, training (e.g., at a computing system) an image classifier that includes a machine learning component by providing the set of training data that includes the two-dimensional images and the training labels assigned to those two-dimensional images to the image classifier. Operations 820 and 822 can form part of the training performed as part of operation 819.

Figure 9:
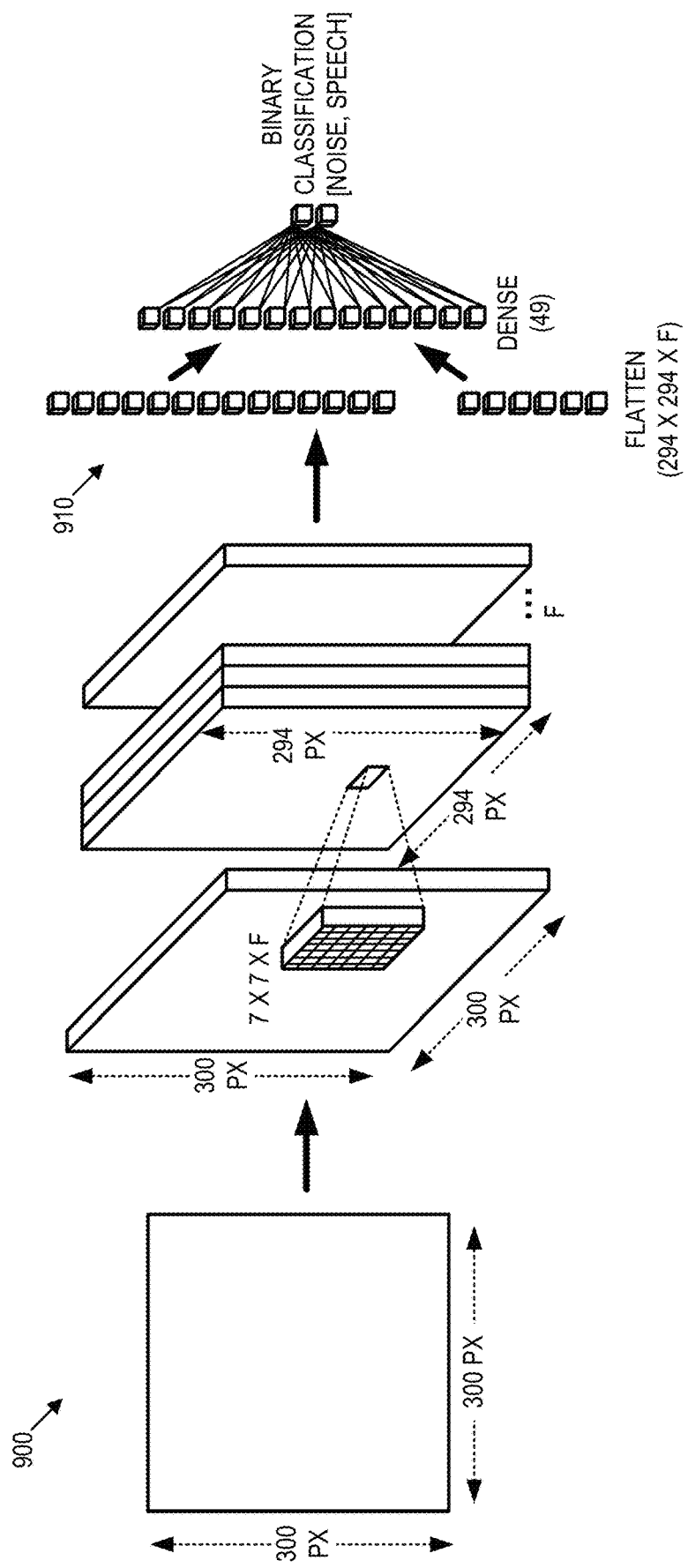
FIG. 9 depicts an example processing pipeline using an image classifier that includes a neural network.

At 820, the method includes providing each two-dimensional image to the image classifier with the assigned training label to train the image classifier. The two-dimensional images provided to the image classifier as part of training can include one or more images labeled as containing speech and one or more images labeled as not containing speech (e.g., noise) by the assigned training labels. The image classifier can include a machine learning component such as a neural network that utilizes the two-dimensional images in combination with the assigned labels to facilitate training that increases the accuracy of the image classifier over successive classification attempts. Within this context, the labels assigned to the images can serve as a ground truth for classification of the images. FIG. 9 describes additional aspects relating to use of the image classifier.

As part of training the image classifier, at 822, the method includes assessing the image classifier throughout training. As an example, one or more images and assigned labels can be provided to the image classifier as part of a first training phase. The accuracy of the image classifier can then be measured over a set of images. Additional training phases can be performed until the accuracy of the image classifier attains a desired accuracy.

At 824, upon the accuracy of the image classifier attaining a desired level of accuracy, the image classifier or an instance of the image classifier can be deployed for field use, such as by performing method 200 of FIG. 2 on two-dimensional images obtained from other audio segments.

As an illustrative example of training in accordance with method 800 of FIG. 8, a set of three fifteen-minute audio samples containing airport clearances from respective airports can be chosen to be the test/train dataset with KL Divergence-based thresholding and manual examination on approximately 6,000 time-windowed audio sub-segments. The corresponding two-dimensional images from these audio sub-segments can be provided as input to the machine learning model of the image classifier as part of training. As a follow-on activity, an even higher level of accuracy may be achieved through processing many new samples with the model and pulling the images from those processing activities back into new order of magnitude larger tensors to retrain the model for further improved fidelity.

FIG. 9 depicts an example processing pipeline 900 using an image classifier that includes a multilayer convolutional neural network (CNN) 910 as an example of a deep neural network (DNN). The formulation of a DNN for the purpose of detecting speech and noise within audio can thus rely on object recognition and classification examples in machine learning tasks. A DNN for image classification can have one or more convolutional neural network initial layers followed by dense layers and decimation to the required number of output classes desired. In an example of a DNN, the network can be optimized around an input image of 300×300 grayscale pixels. However, reducing the quantity of pixels by an order of magnitude to—e.g., 30×30 pixels could provide suitable accuracy in the image classifier for at least some applications.

As an illustrative example, with a 300×300 image input size, the image classifier can be trained on approximately 6,000 images with an 80/20 test/train split to obtain better than 98% accuracy. For this example, the initial neural network layer of the image classifier can be a convolutional layer with a 7×7 kernel with F number of filters. Kernel sizes ranging from 3×3 to 9×9 can be tested, and in some cases a kernel size of 7×7 can provide optimum accuracy (i.e., loss function) based on the input image size and features of noise vs. speech in radio communications. Correspondingly, if image sizes are reduced by an order of magnitude, the pixel feature discrimination may result in much reduced kernel size. A target to anticipate with a 30×30 image size might therefore be a 3×3 kernel.

According to an example, full resolution striding can be used to train the network which results in a total filter product tensor of 294×294×F nodes. These nodes can be flattened into two successive dense rectified linear unit (RELU) layers which are sequentially reduced to the binary output of [noise, speech]. FIG. 9 depicts shows the notional network layout and flow of the DNN design. The arrows in the dense layer reduction depict a fully connected design between the filter tensor and the dense reduction layers. Within FIG. 9, the DNN is constructed as a convolutional neural network CNN on the first layer of the network so as to process the image shape representation into further neural features using CNN techniques. Further layers of the neural network compute the fully dense features of the output of the first CNN layer and then proceed to reduce these features down to a simple binary classification of [noise, speech].

The mathematical framework for processing pipeline 900 can be fashioned as a temporal streaming binary classifier y(n) which passes a two-dimensional image representing a joint distribution of p and q to a DNN model f( ) for the raw binary classification of [noise, speech], as described by the following mathematical representation: y(n)=f(g(p,q)), where y(n)=0, f(g)→noise and 1, f(g)→speech;
x(n,m) is a coarsely windowed vector of m audio samples at discrete time n;
p=PDF(x) is the probability density function of x(n,m);
q=PDF(r) is the probability density function of a normal random distribution;
g(p,q) is the two-dimensional image or feature matrix derived from p and q;
f(g) is non-linear DNN network inference function.

The resulting binary classifier stream y(n) can be processed by non-linear state-based filtering as described with reference to FIG. 5 to provide voice activity detection (VAD) segmentation of the audio streams.

In at least some examples, the methods and processes described herein can be tied to a computing system of one or more computing devices. In particular, such methods and processes can be implemented as a computer-application program or service, an application-programming interface (API), a computer-executable library, and/or other computer-program configuration.

Figure 10:
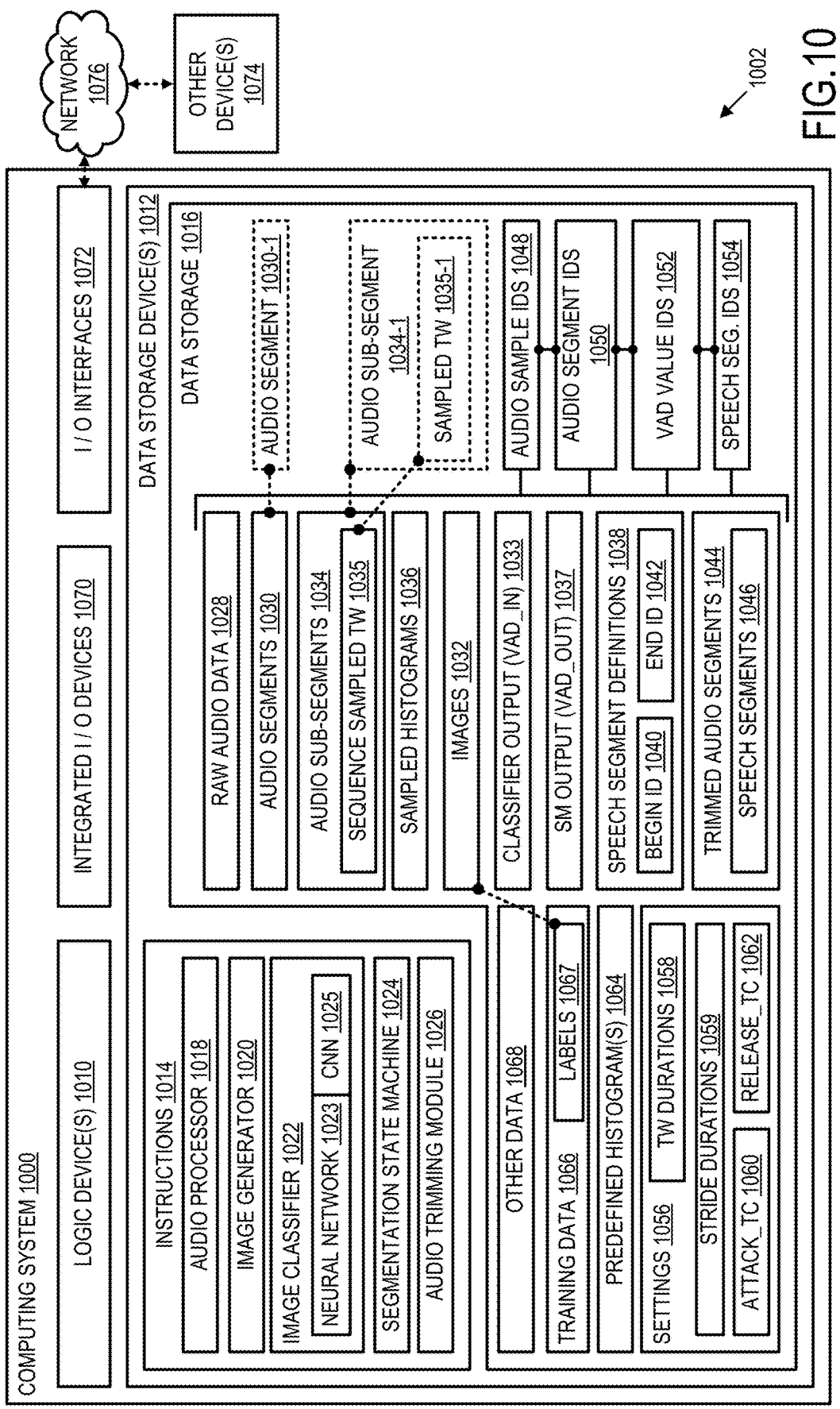
FIG. 10 schematically depicts an example computing system.

FIG. 10 schematically depicts an example of a computing system 1000 that can perform the methods and processes described herein. Computing system 1000 is shown in simplified form. Computing system 1000 can take the form of one or more personal computers, server computers, network computing devices, mobile computing devices, and/or other computing devices. Computing system 1000 can form part of a speech detection machine 1002, which can further include additional components that reside offboard the computing system.

Computing system 1000 includes one or more logic devices 1010, and one or more data storage devices 1012. Logic devices 1010 include physical devices configured to execute instructions and process data, such as example executable instructions 1014 and data of data storage 1016 stored on storage devices 1012. For example, logic devices 1010 can be configured to execute instructions that are part of one or more applications, services, programs, routines, libraries, objects, components, data structures, or other logical constructs. Such instructions can be implemented to perform a task, implement a data type, transform the state of one or more components, achieve a technical effect, or otherwise arrive at a desired result.

Logic devices 1010 can include one or more processors configured to execute software instructions. Additionally or alternatively, logic devices 1010 can include one or more hardware or firmware logic machines configured to execute hardware or firmware instructions. Processors of logic devices 1010 can be single-core or multi-core, and the instructions executed thereon can be configured for sequential, parallel, and/or distributed processing. Individual components of logic devices 1010 can be distributed among two or more separate computing devices, which can be remotely located and/or configured for coordinated processing. Aspects of logic devices 1010 can be virtualized and executed by remotely accessible, networked computing devices configured in a cloud-computing configuration.

Storage devices 1012 include one or more physical devices configured to hold instructions 1014 executable by logic devices 1010 to implement the methods and processes described herein. When such methods and processes are implemented, the state of storage devices 1012 can be transformed—e.g., to hold different data. Storage devices 1012 can include removable and/or built-in devices. Storage devices 1012 can include optical memory, semiconductor memory, and/or magnetic memory, among others. Storage devices 1012 can include volatile, nonvolatile, dynamic, static, read/write, read-only, random-access, sequential-access, location-addressable, file-addressable, and/or content-addressable devices. It will be appreciated that storage devices 1012 include one or more physical devices. However, aspects of instructions 1014 alternatively can be propagated by a communication medium (e.g., an electromagnetic signal, an optical signal, etc.) that is not held by a physical device for a finite duration.

Aspects of logic devices 1010 and storage devices 1012 can be integrated together into one or more hardware-logic components. Such hardware-logic components can include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

In the example depicted in FIG. 10, instructions 1014 include an audio processor 1018, an image generator 1020, an image classifier 1022, a segmentation state machine 1024, and an audio trimming module 1026.

Audio processor 1018 can provide processing of raw audio samples 1028 into audio segments 1030 by performing operations 714-722 of FIG. 7. An individual audio segment 1030-1 is depicted schematically in FIG. 10, which can form part of audio segments 1030.

Image generator 1020 can provide processing of audio segments 1030 into images 1032, including extracting audio sub-segments 1034 from audio segments 1030 and generating sampled histograms 1036 from audio sub-segments 1034 as described with reference to operations 212-218 of FIG. 2. Images 1032 can include any of the two-dimensional images described herein, including example images 300 and 400 of FIGS. 3 and 4.

Image classifier 1022 can receive images 1032 and provide a classifier output 1033 (e.g., VAD_IN signals) that indicates for each of images 1032 whether the audio sub-segment from which that image was generated contains speech or does not contain speech (e.g., contains noise). In the examples described with reference to FIG. 5, the presence of speech can be indicated by a VAD_IN value of "1", whereas a VAD_IN value of "0" indicates that speech is not present. Image classifier 1022 can include a neural network 1023. As an example, neural network 1023 can take the form of a deep neural network that includes a convolutional neural network.

Segmentation state machine 1024 can receive classifier output 1033 (e.g., VAD_IN signals) and provide a state machine output 1037, which refers to the VAD_OUT signals containing the VAD_OUT values described herein. Additionally, segmentation state machine 1024 can output speech segment definitions 1038 for each speech segment detected in audio segments 1030. Speech segment definitions 1038 can include a beginning identifier 1040 and an ending identifier 1042 for each speech segment. Audio trimming module 1026 can trim audio segments 1030 to obtain trimmed audio segments 1044 that contain speech segments 1046.

Data storage 1016 can include a variety of identifiers that enable each of data items 1028-1046 to be tracked and identified by computing system 100. Examples of identifiers that can be associated with data items 1028-1046 include: audio sample identifiers that can be initially assigned to raw audio samples 1028 and can continue to be associated with each of data items 1030-1046 from which trimmed audio segments 1044 are obtained; audio segment identifiers 1050 that can be initially assigned to audio segments 1030 and can continue to be associated with each of data items 1032-1046 from which trimmed audio segments 1044 are obtained; VAD value identifiers 1052 that can be assigned to VAD values of VAD_IN and VAD_OUT signals as well as sampled histograms 1036 and images 1032 from which the individual VAD values originate; and speech segment identifiers 1054 that can be assigned to speech segments 1046 and speech segment definitions 1038. Furthermore, particular identifiers among identifiers 1048-1054 can be associated with each other for a particular raw audio sample and its intermediate data items (e.g., 1030-1046) that are used in the process of identifying one or more speech segments contained within that raw audio sample, thereby enabling particular speech segments, VAD values, audio segments, trimmed audio segments, etc. to be associated with that raw audio sample.

Data storage 1016 can include settings 1056 that can include a time window durations 1058 for extracting audio sub-segments 1034 from audio segments 1030, including coarse and refined time window durations. Audio sub-segments 1034 can form a sequence of sampled time windows 1035 in which each sampled time window has a corresponding time window duration. Within FIG. 10, an individual audio sub-segment 1034-1 of audio sub-segments 1034 is depicted schematically, which forms an individual sampled time window 1035-1 of the sequence of sampled time windows 1035.

Settings 1056 can include stride durations 1059 for sampled values of the sampled histograms. Settings 1056 can include values for attack_tc 1060 and release_tc 1062 as described with reference to FIG. 5. Data storage 1016 can include one or more predefined histograms 1064 that can be used by image generator 1020 in combination with sampled histograms 1036 to generate images 1032, including the two-dimensional images described herein. Data storage 1016 can include training data 1066 including training labels 1067 that are assigned to training two-dimensional images of images 1032 that can be used to train image classifier 1022. Training data 1066 can include instances of any of previously described data items 1028-1046, identifiers 1048-1054, settings 1056, and predefined histograms 1064. Data storage 1016 can further include other suitable data 1068 that can be used to perform the methods or processes described herein.

In examples where refinement is performed, such as described with reference to operation 236 of FIG. 2, reference numerals for data items that are generated as part of the methods and techniques disclosed herein can be referred to using an "R" designation followed by a numeral (e.g., 0, 1, 2, 3, etc.) that designates a quantity of times that operations 210-230 of FIG. 2 have been repeated. For example, on a first pass through operations 210-230 of FIG. 2, audio sub-segments 1034 can include audio sub-segments 1034-R0 that correspond to the audio sub-segments forming a sequence of sampled time windows 1035-R0 that were generated as part of the first pass. Through refinement at operation 236, operations 210-230 can be repeated to generate refined audio sub-segments 1034-R1 forming a refined sequence of sampled time windows 1035-R1.

Continuing with the above example, each sampled time window 1035-R0 of a plurality of audio sub-segments 1034-R0 can be of a first duration of time 1058-R0. As part of refinement performed using method 200 of FIG. 2, at 212, a second plurality of audio sub-segments 1034-R1 can be extracted, which forms a sequence of sampled time windows 1035-R1 within a reduced duration of the audio segment (e.g., 1030-1) that includes at least the speech segment (e.g., 120 of FIG. 1). Here, each sampled time window 1035-1R1 of the second plurality of audio sub-segments 1034-R1 can be of a second duration of time (1058-R1) that is less than the first duration of time (1058-R0). For each audio sub-segment (e.g., 1034-1R1) of the second plurality of audio sub-segments 1034-R1, method 200 can include: generating a refined sampled histogram 1036-R1 of a plurality of sampled values across the sampled time window 1035-1R1 of the audio sub-segment 1034-1R1; generating a refined two-dimensional image 1032-R1 that represents a refined two-dimensional mapping (e.g., 330, 430) of the refined sampled histogram 1036-R1 and the predefined histogram (e.g., 320); providing the refined two-dimensional image 1032-R1 to the image classifier (e.g., 1022); and receiving a refined output 1033-R1 from the image classifier based on the refined two-dimensional image 1032-R1. The refined output 1033-R1 can indicate whether the audio sub-segment (e.g., 1034-1R1) contains speech. Furthermore, as part of refinement performed with respect to method 200 of FIG. 2, a refined beginning 140-R1 and a refined ending 142-R1 of the speech segment (e.g., 120 of FIG. 1) can be identified within the audio segment 1030-1 based on the refined output 1033-R1 received from the image classifier for each audio sub-segment (e.g., 1034-1R1) of the second plurality of audio sub-segments (1034-R1). Method 200 of FIG. 2 can include outputting one or more refined identifiers 1040-R1, 1042-R1 indicating the refined beginning (e.g., 140-R1) and the refined ending (e.g., 142-R1) of the speech segment (e.g., 120) within audio segment 1030-1. The audio segment can be trimmed based on the one or more refined identifiers 1040-R1, 1042-R2 indicating the refined beginning (e.g., 140-R1) and the refined ending (e.g., 142-R2) of the speech to obtain a trimmed audio segment 1044 that has a reduced duration as compared to audio segment 1030-1 and that contains speech segment 1046.

Computing system 1000 can further include one or more integrated input/output devices 1070, and one or more input/output interfaces configured to communicate with non-integrated input and/or output devices depicted schematically in FIG. 10 as other devices 1074. In at least some examples, communications between computing system 1000 and other devices 1074 can be provided via a communications network 1076. Network 1076 can include one or more data networks supporting wired or wireless communications such as the Internet or a portion thereof as well as wireless local area networks, edge networks, and wide area networks.

As an example, a radio communications receiver can be provided as part of integrated input/output devices 1070, input/output interfaces 1072, or other devices 1074 by which radio communications can be received and stored as raw audio samples 1028. Integrated input/output devices 1070 and other devices 1074 can include audio output devices such as audio speakers by which trimmed audio segments 1044 can be audibly output. Integrated input/output devices 1070 and other devices 1074 can include graphical display devices by which text representations of trimmed audio segments 1044 can be visually output. Furthermore, other devices 1074 can include remotely located computing devices.

The terms "module," "program," and "engine" can be used to describe an aspect of computing system 1000 implemented to perform a particular function. In some cases, a module, program, or engine can be instantiated via logic devices 1010 executing instructions held by storage devices 1012. It will be understood that different modules, programs, and/or engines can be instantiated from the same application, service, code block, object, library, routine, API, function, etc. Likewise, the same module, program, and/or engine can be instantiated by different applications, services, code blocks, objects, routines, APIs, functions, etc. The terms "module," "program," and "engine" can encompass individual or groups of executable files, data files, libraries, drivers, scripts, database records, etc. The term "service" can be used to refer to a program executable across multiple user or device sessions. A service can be available to one or more system components, programs, and/or other services. In some examples, a service can run on one or more server-computing devices.

Examples of the subject matter of the present disclosure are described in the following enumerated paragraphs.

A.1. A method performed by a computing system, the method comprising: obtaining an audio segment of radio communications; extracting an audio sub-segment within the audio segment; generating a sampled histogram of a plurality of sampled values across a sampled time window of the audio sub-segment; generating a two-dimensional image that represents a two-dimensional mapping of the sampled histogram along a first dimension and a predefined histogram along a second dimension that is orthogonal to the first dimension; providing the two-dimensional image to an image classifier previously trained using the predefined histogram; and receiving an output from the image classifier based on the two-dimensional image, the output indicating whether the audio sub-segment contains speech.

A.2 The method of paragraph A.1, wherein the audio sub-segment is one of a plurality of audio sub-segments; wherein the method further comprises: extracting the plurality of audio sub-segments forming a sequence of sampled time windows within the audio segment; for each audio sub-segment of the plurality of audio sub-segments: generating a sampled histogram of a plurality of sampled values across the sampled time window of the audio sub-segment; generating a two-dimensional image that represents a two-dimensional mapping of the sampled histogram along the first dimension and the predefined histogram along the second dimension that is orthogonal to the first dimension, providing the two-dimensional image to the image classifier previously trained using the predefined histogram, and receiving an output from the image classifier based on the two-dimensional image, the output indicating whether the audio sub-segment contains speech; identifying a beginning and an ending of a speech segment within the audio segment based on the output received from the image classifier for the plurality of audio sub-segments; and outputting one or more identifiers indicating the beginning and the ending of the speech segment within the audio segment.

A.3. The method of any of paragraphs A.1-A.2, further comprising: trimming the audio segment based on the one or more identifiers indicating the beginning and the ending of the speech segment to obtain a trimmed audio segment of reduced duration that contains the speech segment; and storing the trimmed audio segment in a data storage device in association with an audio segment identifier.

A.4. The method of any of paragraphs A.1-A.3, wherein identifying the beginning and the ending of the speech segment within the audio segment includes joining two or more utterances within the audio segment that are separated in time by less than a threshold duration to form the speech segment.

A.5. The method of any of paragraphs A.1-A.4, wherein identifying the beginning and the ending of the speech segment within audio segment includes separating the speech segment from one or more other speech segments within the audio segment based on two or more utterances within the audio segment being separated in time by more than a threshold duration.

A.6. The method of any of paragraphs A.1-A.5, wherein each sampled time window of the plurality of audio sub-segments is a first duration of time; and wherein the method further comprises: extracting a second plurality of audio sub-segments forming a sequence of sampled time windows within a reduced duration of the audio segment that includes at least the speech segment, wherein each sampled time window of the second plurality of audio sub-segments is a second duration of time that is less than the first duration of time; for each audio sub-segment of the second plurality of audio sub-segments: generating a refined sampled histogram of a plurality of sampled values across the sampled time window of the audio sub-segment, generating a refined two-dimensional image that represents a refined two-dimensional mapping of the refined sampled histogram along the first dimension and the predefined histogram along the second dimension that is orthogonal to the first dimension, providing the refined two-dimensional image to the image classifier, and receiving a refined output from the image classifier based on the refined two-dimensional image, the refined output indicating whether the audio sub-segment contains speech; identifying a refined beginning and a refined ending of the speech segment within the audio segment based on the refined output received from the image classifier for each audio sub-segment of the second plurality of audio sub-segments; and outputting one or more refined identifiers indicating the refined beginning and the refined ending of the speech segment within the audio segment.

A.7. The method of paragraph A.6, further comprising: trimming the audio segment based on the one or more refined identifiers indicating the refined beginning and the refined ending of the speech to obtain a trimmed audio segment of reduced duration that contains the speech segment; and storing the trimmed audio segment in a data storage device in association with an audio segment identifier.

A.8. The method of any of paragraphs A.1-A.7, wherein the predefined histogram defines a standard Gaussian distribution.

A.9 The method of any of paragraphs A.1-A.8, wherein each two-dimensional image generated for the plurality of audio sub-segments represents a covariance matrix of a first probability density function corresponding to the sampled histogram and a second probability density function corresponding to the predefined histogram.

A.10. The method of any of paragraphs A.1-A.9, wherein the image classifier includes a convolutional neural network.

A.11. The method of any of paragraphs A.1-A.10, wherein the image classifier was previously trained using training two-dimensional images each formed by the predefined histogram in combination with one of a plurality of sampled histograms generated from a plurality of training audio sub-segments of radio communications; wherein at least some of the training audio sub-segments contain speech and at least some of the training audio sub-segments do not contain speech.

B.1. A speech detection method, comprising: obtaining audio contained within radio communications; processing the audio to obtain a set of training data that includes a plurality of two-dimensional images by: for each audio segment of one or more audio segments contained in the audio, extracting a plurality of audio sub-segments forming a sequence of sampled time windows within the audio segment, wherein at least some of the audio sub-segments extracted from the one or more audio segments contain speech and at least some of the audio sub-segments extracted from the one or more audio segments do not contain speech; for each audio sub-segment of the one or more audio segments, generating a sampled histogram of a plurality of sampled values across the sampled time window of the audio sub-segment, generating a two-dimensional image that represents a two-dimensional mapping of the sampled histogram along a first dimension and a predefined histogram along a second dimension that is orthogonal to the first dimension, and assigning a training label with the two-dimensional image as part of the set of training data, each training label indicating whether the two-dimensional image with which the training label is assigned represents speech contained within the audio sub-segment from which the two-dimensional image was generated; training, at a computing system, an image classifier that includes a machine learning component by providing the set of training data that includes the two-dimensional images and the training labels to the image classifier; following training of the image classifier, providing a subject two-dimensional image to the image classifier, the subject two-dimensional image representing a two-dimensional mapping of a sampled histogram of a subject audio sub-segment along the first dimension and the predefined histogram along the second dimension that is orthogonal to the first dimension;

and receiving an output from the image classifier based on the subject two-dimensional image, the output indicating whether the subject audio sub-segment contains speech.

B.2. The method of any of paragraph B.1, wherein the machine learning component of the image classifier includes a convolutional neural network.

B.3. The method of any of paragraphs B.1-B.2, wherein the predefined histogram defines a standard Gaussian distribution.

B.4. The method of any of paragraphs B.1-B.3, wherein each two-dimensional image includes a scatter plot.

B.5. The method of any of paragraphs B.1-B.4, wherein each two-dimensional image generated for the plurality of audio sub-segments represents a covariance matrix of a first probability density function corresponding to the sampled histogram and a second probability density function corresponding to the predefined histogram.

B.6. The method of any of paragraphs B.1-B.5, further comprising: obtaining the audio contained within the radio communications by receiving the radio communications and recording the audio contained within the radio communications between an air traffic control source and an aircraft.

C.1. A speech detection machine, comprising: a computing system having instructions stored thereon executable by one or more logic devices of the computing system to: obtain an audio segment of radio communications; extract a plurality of audio sub-segments forming a sequence of sampled time windows within the audio segment; for each audio sub-segment of the plurality of audio sub-segments: generate a sampled histogram of a plurality of sampled values across the sampled time window of the audio sub-segment, generate a two-dimensional image that represents a two-dimensional mapping of the sampled histogram along a first dimension and a predefined histogram along a second dimension that is orthogonal to the first dimension, provide the two-dimensional image to an image classifier defined by the instructions that was previously trained using the predefined histogram, and receive an output from the image classifier based on the two-dimensional image, the output indicating whether the audio sub-segment contains speech; identify a beginning and an ending of a speech segment within the audio segment based on the output received from the image classifier for each audio sub-segment of the plurality of audio sub-segments; and output one or more identifiers indicating the beginning and the ending of the speech segment within the audio segment.

C.2. The method of paragraph C.1, wherein the image classifier includes a convolutional neural network.

C.3. The method of any of paragraphs C.1-C.2, wherein the image classifier was previously trained using training two-dimensional images each formed by the predefined histogram in combination with one of a plurality of sampled histograms generated from a plurality of training audio sub-segments of radio communications; wherein at least some of the training audio sub-segments contain speech and at least some of the training audio sub-segments do not contain speech.

It will be understood that the configurations, techniques, and approaches described herein are exemplary in nature, and that specific examples are not to be considered in a limiting sense, because numerous variations are possible. The specific methods and processes described herein can represent one or more of any number of processing strategies. As such, various acts illustrated and/or described can be performed in the sequence illustrated and/or described, in other sequences, in parallel, omitted, or re-ordered where suitable. As an example, bi-directional transformations using Deep Bidirectional Transformers (BERT) can be used for natural language processing of audio segments trimmed using the techniques disclosed herein.

The subject matter of the present disclosure includes all novel and non-obvious combinations and sub-combinations of the various methods, systems and configurations, and other features, functions, acts, and/or properties disclosed herein, as well as any and all equivalents thereof.

The invention claimed is:

1. A method performed by a computing system, the method comprising:
   obtaining an audio segment of radio communications;
   extracting an audio sub-segment within the audio segment;
   generating a sampled histogram of a plurality of sampled values across a sampled time window of the audio sub-segment;
   generating a two-dimensional image that represents a two-dimensional mapping of the sampled histogram along a first dimension and a predefined histogram along a second dimension that is orthogonal to the first dimension;
   providing the two-dimensional image to an image classifier previously trained using the predefined histogram; and
   receiving an output from the image classifier based on the two-dimensional image, the output indicating whether the audio sub-segment contains speech.

2. The method of claim 1, wherein the audio sub-segment is one of a plurality of audio sub-segments;
   wherein the method further comprises:
      extracting the plurality of audio sub-segments forming a sequence of sampled time windows within the audio segment;
      for each audio sub-segment of the plurality of audio sub-segments:
         generating a sampled histogram of a plurality of sampled values across the sampled time window of the audio sub-segment;
         generating a two-dimensional image that represents a two-dimensional mapping of the sampled histogram along the first dimension and the predefined histogram along the second dimension that is orthogonal to the first dimension,
         providing the two-dimensional image to the image classifier previously trained using the predefined histogram, and
         receiving an output from the image classifier based on the two-dimensional image, the output indicating whether the audio sub-segment contains speech;
      identifying a beginning and an ending of a speech segment within the audio segment based on the output received from the image classifier for the plurality of audio sub-segments; and
      outputting one or more identifiers indicating the beginning and the ending of the speech segment within the audio segment.

3. The method of claim 2, further comprising:
   trimming the audio segment based on the one or more identifiers indicating the beginning and the ending of the speech segment to obtain a trimmed audio segment of reduced duration that contains the speech segment; and
   storing the trimmed audio segment in a data storage device in association with an audio segment identifier.

4. The method of claim 2, wherein identifying the beginning and the ending of the speech segment within the audio segment includes joining two or more utterances within the audio segment that are separated in time by less than a threshold duration to form the speech segment.

5. The method of claim 2, wherein identifying the beginning and the ending of the speech segment within audio segment includes separating the speech segment from one or more other speech segments within the audio segment based on two or more utterances within the audio segment being separated in time by more than a threshold duration.

6. The method of claim 2, wherein each sampled time window of the plurality of audio sub-segments is a first duration of time; and wherein the method further comprises:
extracting a second plurality of audio sub-segments forming a sequence of sampled time windows within a reduced duration of the audio segment that includes at least the speech segment, wherein each sampled time window of the second plurality of audio sub-segments is a second duration of time that is less than the first duration of time;
for each audio sub-segment of the second plurality of audio sub-segments:
generating a refined sampled histogram of a plurality of sampled values across the sampled time window of the audio sub-segment,
generating a refined two-dimensional image that represents a refined two-dimensional mapping of the refined sampled histogram along the first dimension and the predefined histogram along the second dimension that is orthogonal to the first dimension,
providing the refined two-dimensional image to the image classifier, and
receiving a refined output from the image classifier based on the refined two-dimensional image, the refined output indicating whether the audio sub-segment contains speech;
identifying a refined beginning and a refined ending of the speech segment within the audio segment based on the refined output received from the image classifier for each audio sub-segment of the second plurality of audio sub-segments; and
outputting one or more refined identifiers indicating the refined beginning and the refined ending of the speech segment within the audio segment.

7. The method of claim 6, further comprising:
trimming the audio segment based on the one or more refined identifiers indicating the refined beginning and the refined ending of the speech to obtain a trimmed audio segment of reduced duration that contains the speech segment; and
storing the trimmed audio segment in a data storage device in association with an audio segment identifier.

8. The method of claim 1, wherein the predefined histogram defines a standard Gaussian distribution.

9. The method of claim 1, wherein each two-dimensional image generated for the plurality of audio sub-segments represents a covariance matrix of a first probability density function corresponding to the sampled histogram and a second probability density function corresponding to the predefined histogram.

10. The method of claim 1, wherein the image classifier includes a convolutional neural network.

11. The method of claim 1, wherein the image classifier was previously trained using training two-dimensional images each formed by the predefined histogram in combination with one of a plurality of sampled histograms generated from a plurality of training audio sub-segments of radio communications;
wherein at least some of the training audio sub-segments contain speech and at least some of the training audio sub-segments do not contain speech.

12. A speech detection method, comprising:
obtaining audio contained within radio communications;
processing the audio to obtain a set of training data that includes a plurality of two-dimensional images by:
for each audio segment of one or more audio segments contained in the audio, extracting a plurality of audio sub-segments forming a sequence of sampled time windows within the audio segment,
wherein at least some of the audio sub-segments extracted from the one or more audio segments contain speech and at least some of the audio sub-segments extracted from the one or more audio segments do not contain speech;
for each audio sub-segment of the one or more audio segments,
generating a sampled histogram of a plurality of sampled values across the sampled time window of the audio sub-segment,
generating a two-dimensional image that represents a two-dimensional mapping of the sampled histogram along a first dimension and a predefined histogram along a second dimension that is orthogonal to the first dimension, and
assigning a training label with the two-dimensional image as part of the set of training data, each training label indicating whether the two-dimensional image with which the training label is assigned represents speech contained within the audio sub-segment from which the two-dimensional image was generated;
training, at a computing system, an image classifier that includes a machine learning component by providing the set of training data that includes the two-dimensional images and the training labels to the image classifier;
following training of the image classifier, providing a subject two-dimensional image to the image classifier, the subject two-dimensional image representing a two-dimensional mapping of a sampled histogram of a subject audio sub-segment along the first dimension and the predefined histogram along the second dimension that is orthogonal to the first dimension; and
receiving an output from the image classifier based on the subject two-dimensional image, the output indicating whether the subject audio sub-segment contains speech.

13. The method of claim 12, wherein the machine learning component of the image classifier includes a convolutional neural network.

14. The method of claim 12, wherein the predefined histogram defines a standard Gaussian distribution.

15. The method of claim 12, wherein each two-dimensional image includes a scatter plot.

16. The method of claim 12, wherein each two-dimensional image generated for the plurality of audio sub-segments represents a covariance matrix of a first probability density function corresponding to the sampled histogram and a second probability density function corresponding to the predefined histogram.

17. The method of claim 12, further comprising:

obtaining the set of initial data that includes the one or more audio segments of radio communications by receiving the radio communications and recording the radio communications between an air traffic control source and an aircraft.

18. A speech detection machine, comprising:

a computing system having instructions stored thereon executable by one or more logic devices of the computing system to:

obtain an audio segment of radio communications;

extract a plurality of audio sub-segments forming a sequence of sampled time windows within the audio segment;

for each audio sub-segment of the plurality of audio sub-segments:

generate a sampled histogram of a plurality of sampled values across the sampled time window of the audio sub-segment, generate a two-dimensional image that represents a two-dimensional mapping of the sampled histogram along a first dimension and a predefined histogram along a second dimension that is orthogonal to the first dimension, provide the two-dimensional image to an image classifier defined by the instructions that was previously trained using the predefined histogram, and receive an output from the image classifier based on the two-dimensional image, the output indicating whether the audio sub-segment contains speech;

identify a beginning and an ending of a speech segment within the audio segment based on the output received from the image classifier for each audio sub-segment of the plurality of audio sub-segments; and output one or more identifiers indicating the beginning and the ending of the speech segment within the audio segment.

19. The speech detection machine of claim 18, wherein the image classifier includes a convolutional neural network.

20. The speech detection machine of claim 18, wherein the image classifier was previously trained using training two-dimensional images each formed by the predefined histogram in combination with one of a plurality of sampled histograms generated from a plurality of training audio sub-segments of radio communications;

wherein at least some of the training audio sub-segments contain speech and at least some of the training audio sub-segments do not contain speech.

* * * * *